United States Patent
Zuniga et al.

(10) Patent No.: US 9,066,328 B2
(45) Date of Patent: Jun. 23, 2015

(54) METHOD AND APPARATUS FOR SUPPORTING DYNAMIC AND DISTRIBUTED MOBILITY MANAGEMENT

(71) Applicant: InterDigital Patent Holdings, Inc., Wilmington, DE (US)

(72) Inventors: Juan Carlos Zuniga, Montreal (CA); Carlos Jesus Bernardos, Madrid (ES); Alexander Reznik, Titusville, NJ (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 16 days.

(21) Appl. No.: 13/777,490

(22) Filed: Feb. 26, 2013

(65) Prior Publication Data

US 2013/0230021 A1    Sep. 5, 2013

Related U.S. Application Data

(60) Provisional application No. 61/605,551, filed on Mar. 1, 2012.

(51) Int. Cl.
| | |
|---|---|
| *H04W 4/00* | (2009.01) |
| *H04L 12/28* | (2006.01) |
| *H04W 8/08* | (2009.01) |
| *H04W 76/02* | (2009.01) |
| *H04W 36/00* | (2009.01) |
| *H04W 80/04* | (2009.01) |

(52) U.S. Cl.
CPC .......... *H04W 76/025* (2013.01); *H04W 8/087* (2013.01); *H04W 36/0011* (2013.01); *H04W 80/04* (2013.01)

(58) Field of Classification Search
USPC .................. 370/338, 392, 401, 410
See application file for complete search history.

(56) References Cited

U.S. PATENT DOCUMENTS

| | | | | |
|---|---|---|---|---|
| 2007/0250642 | A1* | 10/2007 | Thubert et al. | 709/245 |
| 2007/0258473 | A1* | 11/2007 | Ruffino et al. | 370/401 |
| 2010/0124198 | A1* | 5/2010 | Wong | 370/329 |
| 2010/0130171 | A1* | 5/2010 | Palanigounder et al. | 455/411 |
| 2010/0199332 | A1* | 8/2010 | Bachmann et al. | 726/4 |
| 2010/0215019 | A1* | 8/2010 | Velev et al. | 370/331 |
| 2011/0007671 | A1* | 1/2011 | Yu | 370/255 |
| 2011/0280134 | A1* | 11/2011 | Zheng | 370/241 |
| 2011/0299463 | A1* | 12/2011 | Bachmann et al. | 370/328 |
| 2013/0034108 | A1* | 2/2013 | Kaippallimalil et al. | 370/401 |

(Continued)

OTHER PUBLICATIONS

Bagnulo et al., "Traffic Engineering in Multihomed Sites," IEEE Symposium on Computers and Communications (ISCC 2005) (Jun. 27-30, 2005).

(Continued)

*Primary Examiner* — Andrew Lee
(74) *Attorney, Agent, or Firm* — Condo Roccia Koptiw LLP

(57) ABSTRACT

A method and apparatus are described for supporting dynamic and distributed mobility management (DMM). A wireless transmit/receive unit (WTRU) may attach to a first distributed gateway (D-GW), and configure a first Internet protocol (IP) address based on a prefix locally provided by the first D-GW. The WTRU may move and attach to a second D-GW while carrying out an on-going communication session with a correspondent node (CN). The WTRU may configure a second IP address based on a prefix provided by the second D-GW. The WTRU may use the first IP address for carrying out the on-going session and use the second IP address for a new communication session.

20 Claims, 25 Drawing Sheets

(56) References Cited

U.S. PATENT DOCUMENTS

2013/0086634 A1* 4/2013 Dee et al. ............................ 726/3
2013/0142172 A1* 6/2013 Parsons et al. ................. 370/331

OTHER PUBLICATIONS

Bernardos et al., "A IPv6 Distributed Client Mobility Management Approach Using Existing Mechanisms," MEXT Working Group, Internet-Draft (Mar. 7, 2011).
Bernardos et al., "A PMIPv6-based soltution for Distributed Mobility Management," MEXT Working Group, Internet-Draft (Jul. 11, 2011).
Chan, "Problem statement for distributed and dynamic mobility management," Network Working Group, Internet-Draft, draft-chan-distributed-mobility-ps-02 (Mar. 20, 2011).
Draves et al., "Default Router Preferences and More-Specific Routes," Network Working Group, Request for Comments: 4191 (Nov. 2005).
Draves, "Default Address Selection for Internet Protocol version 6 (IPv6)," Network Working Group, Request for Comments: 3484 (Feb. 2003).
Gundavelli et al., "Proxy Mobile IPv6," Network Working Group, Request for Comments: 5213 (Aug. 2008).
Kuntz et al., "A Summary of Distributed Mobility Management," MEXT Working Group, Internet-Draft (Aug. 11, 2011).
Matsumoto et al., "Problem Statement for Default Address Selection in Multi-Prefix Environments: Operational Issuses of RFC 3484 Default Rules," Network Working Group, Request for Comments: 5220 (Jul. 2008).
Melia et al., "Logical Interface Support for multi-mode IP Hosts," NETEXT WG, Internet-Draft, draft-ietf-netext-logical-interface-support-04.txt (Oct. 31, 2014).
Narten et al., "Neighbor Discovery for IP version 6 (IPv6)," Network Working Group, Request for Comments: 4861 (Sep. 2007).
Perkins et al., "Mobility Support in IPv6," Internet Engineering Task Force (IETF), Request for Comments: 6275 (Jul. 2011).
Seite et al., Dynamic Mobilit Anchoring, Network Working Group, Internet-Draft (Nov. 13, 2011).
Soliman, "Mobile IPv6 Support for Dual Stack Hosts and Routers," Network Working Group, Request for Comments: 5555 (Jun. 2009).
Thomson et al., "IPv6 Stateless Address Autoconfiguration," Network Working Group, Request for Comments: 4862 (Sep. 2007).

* cited by examiner

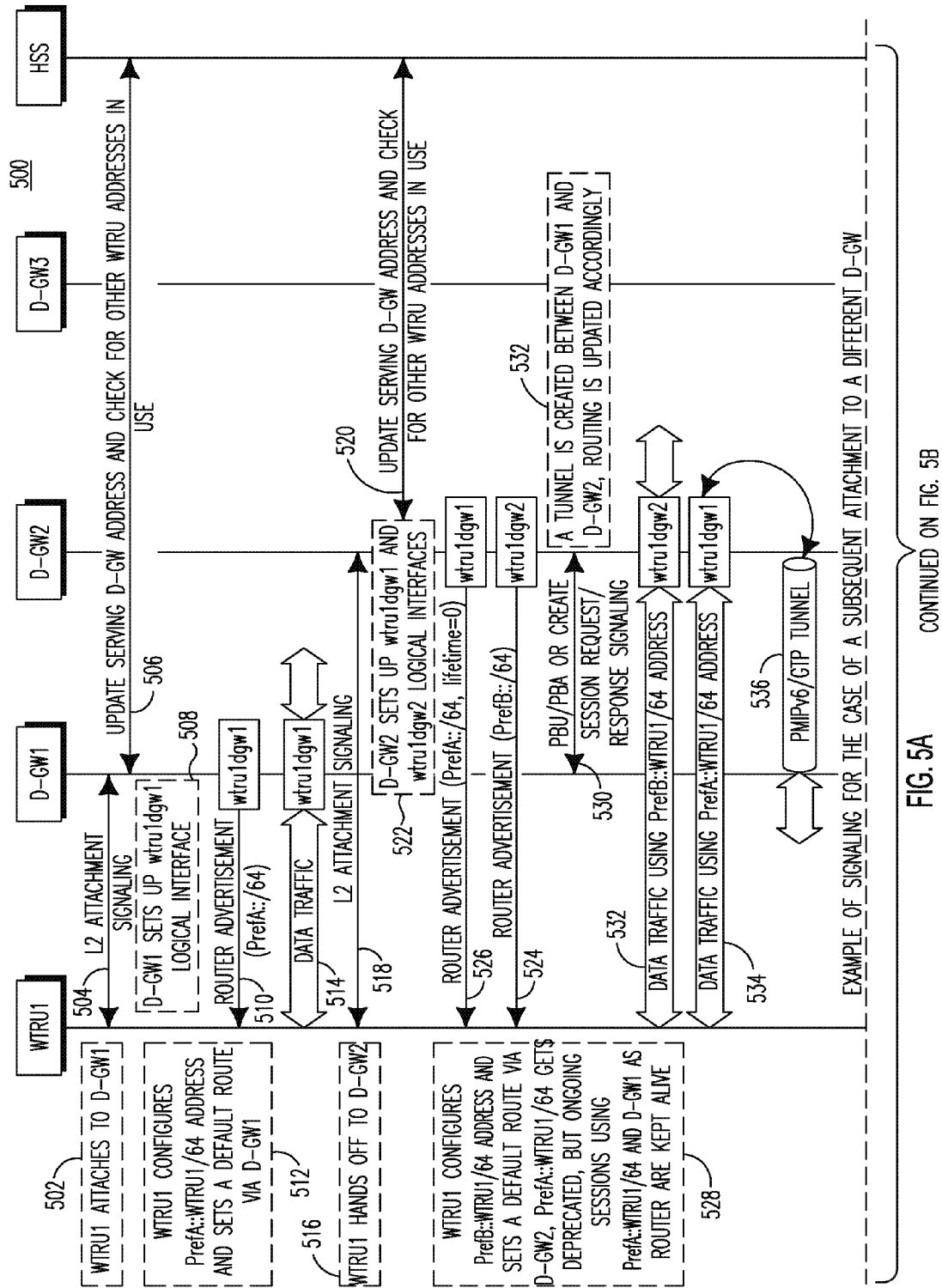
FIG. 5A   CONTINUED ON FIG. 5B

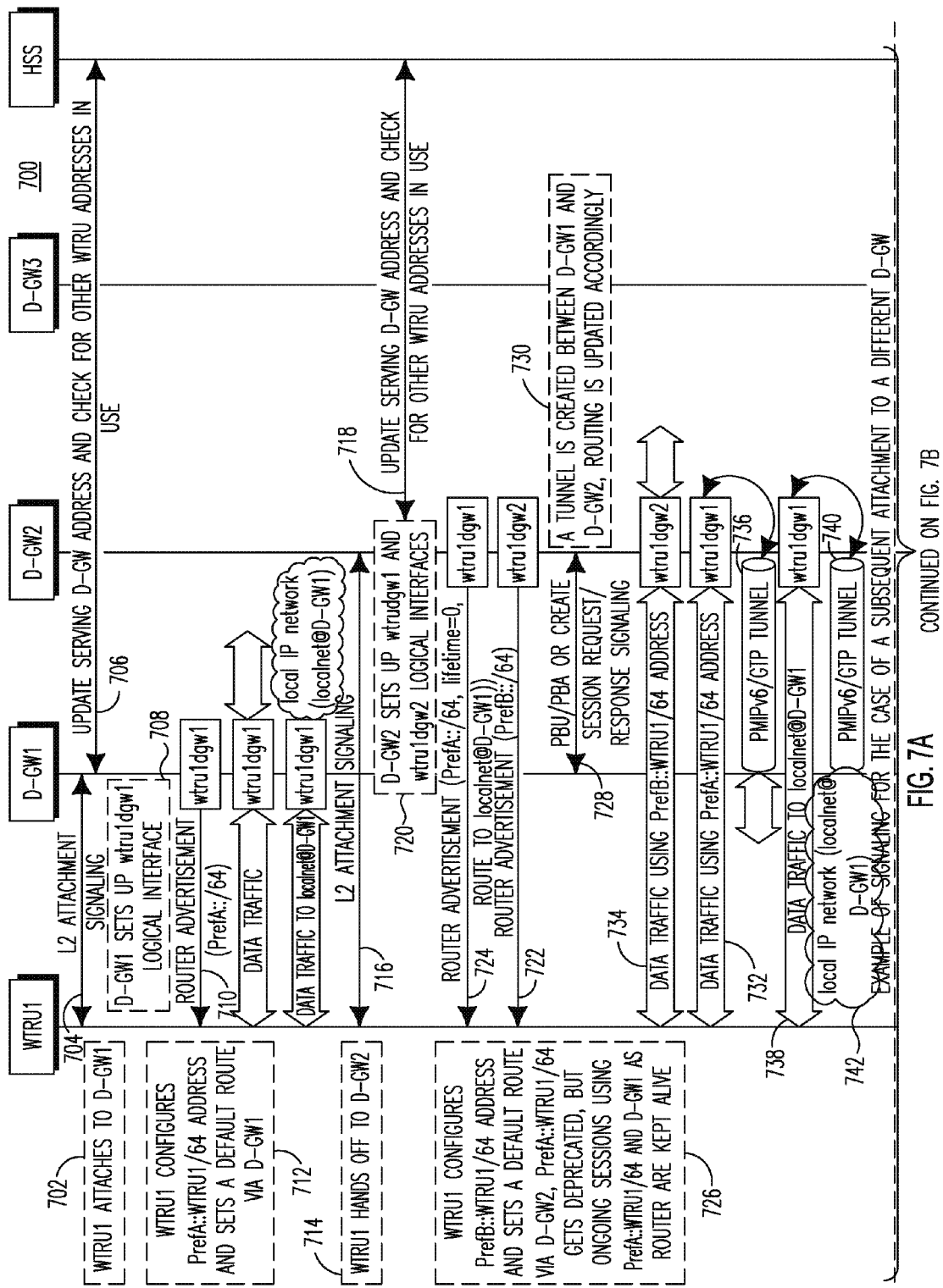

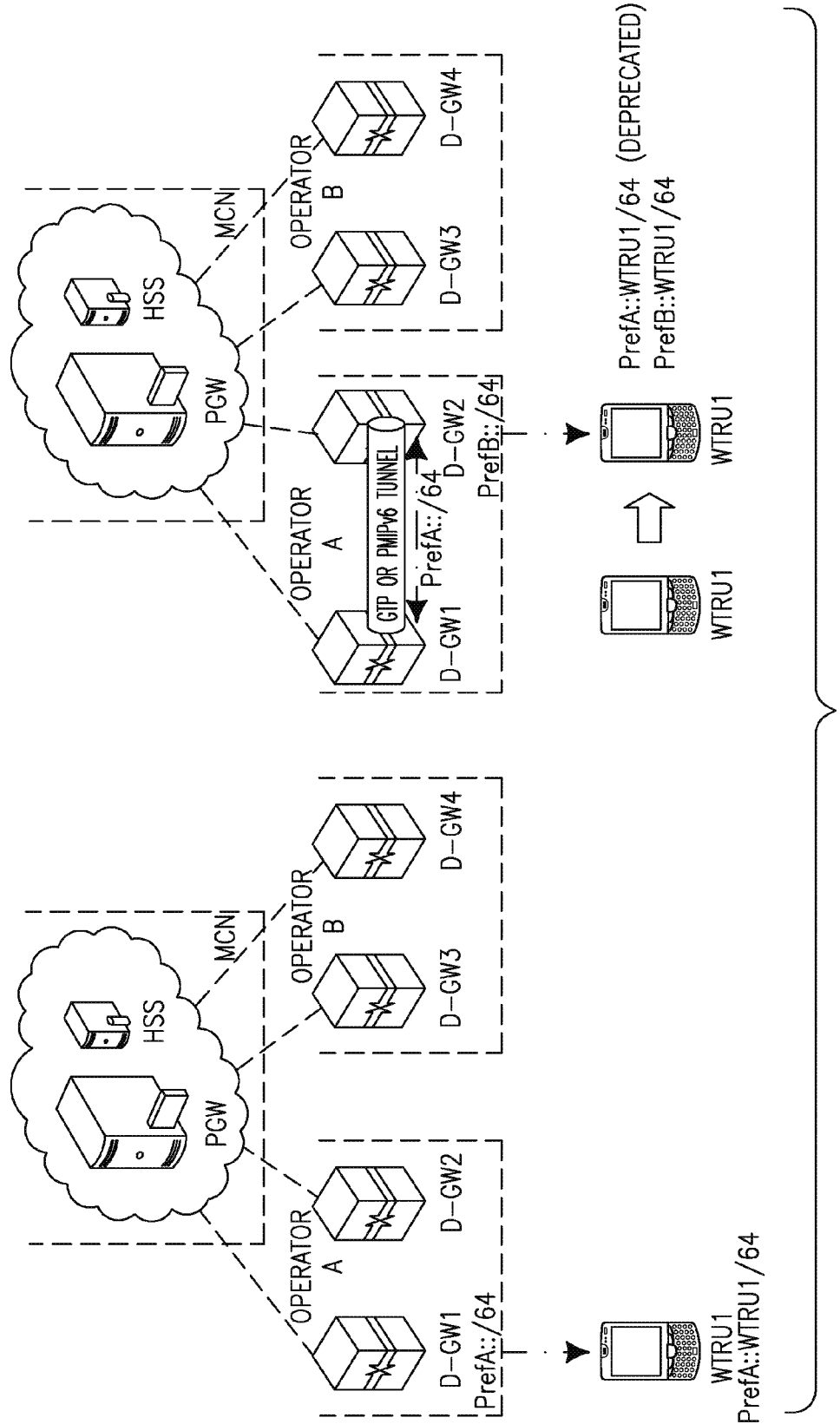

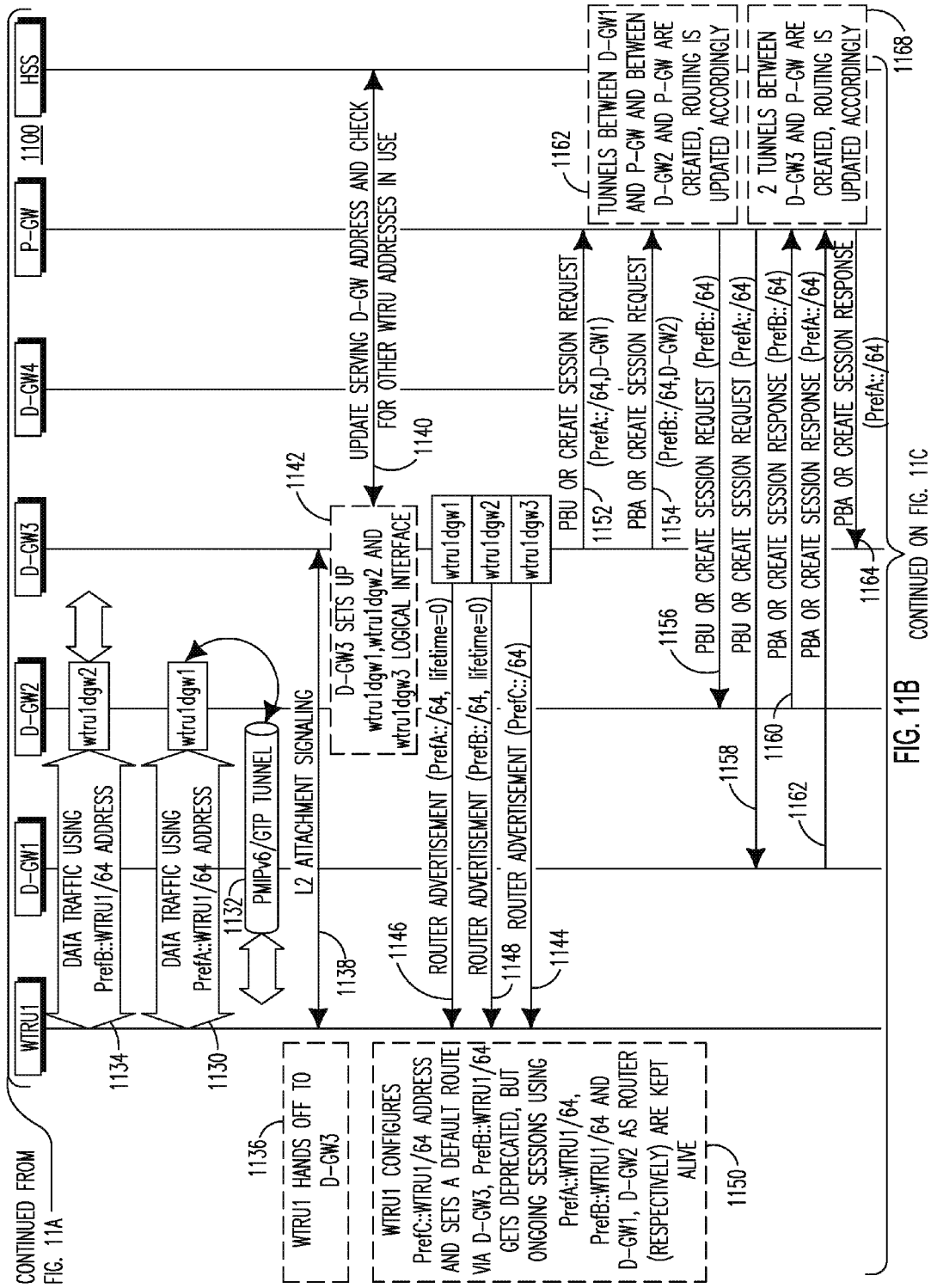
FIG. 11B    CONTINUED ON FIG. 11C

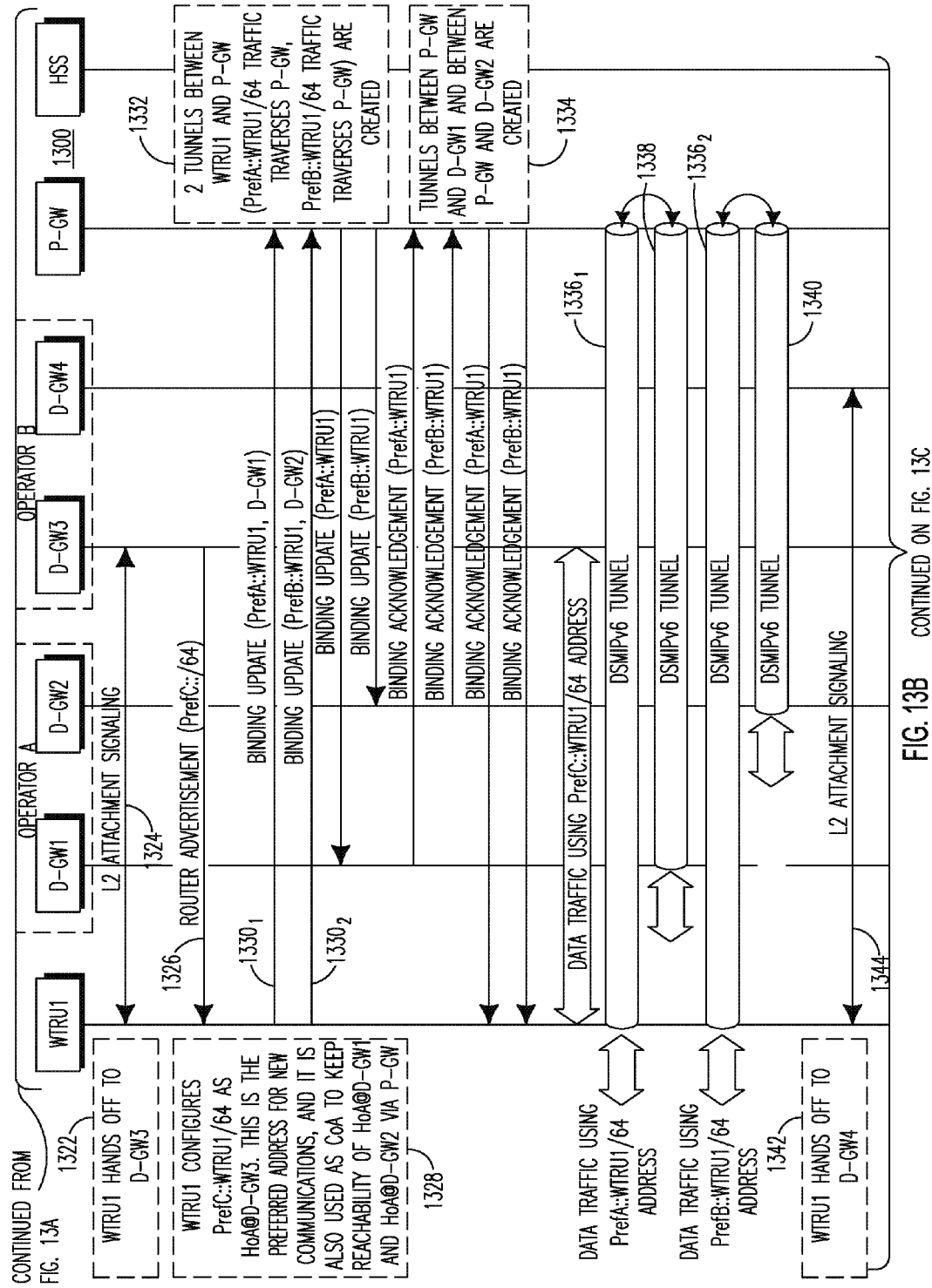
FIG. 13B   CONTINUED ON FIG. 13C

METHOD AND APPARATUS FOR SUPPORTING DYNAMIC AND DISTRIBUTED MOBILITY MANAGEMENT

CROSS REFERENCE TO RELATED APPLICATIONS

This application claims the benefit of U.S. Provisional Application No. 61/605,551, filed on Mar. 1, 2012, the contents of which are incorporated by reference herein.

BACKGROUND

Centralized mobility solutions, such as mobile Internet protocol version 6 (IPv6) or the different macro-level mobility management solutions of third generation partnership project (3GPP) evolved packet system (EPS), may base operation on the existence of a central entity, for example, home agent (HA), local mobility anchor (LMA), packet data network (PDN) gateway (PGW), or gateway general packet radio service (GPRS) support node (GGSN), that anchors the Internet protocol (IP) address used by a wireless transmit/receive unit (WTRU), (i.e., a mobile node (MN)). This central anchor point may be in charge of tracking the location of the WTRU and redirecting its traffic towards its current topological location. While this manner of addressing mobility management has been fully developed by the mobile IP protocol family and its many extensions, there are also several limitations that have been identified.

Distributed and dynamic mobility management (DMM) basically develops the concept of a flatter system, in which mobility anchors may be placed closer to the user, thus distributing the control and data infrastructures among the entities located at the edge of the access network. DMM solutions have addressed cases when a WTRU is anchored at a single point and, due to movement, some reconfiguration, and access to different content, a new network anchor may be needed. However, it has not been defined how a DMM solution may work when a WTRU needs to connect to multiple anchors across one or multiple operators. In this case, it is expected that the WTRU may establish different sessions with multiple data flows and may need to connect to multiple gateways, which may potentially pertain to different operators, as it moves along.

SUMMARY

A method and apparatus are described for supporting dynamic and distributed mobility management (DMM). A wireless transmit/receive unit (WTRU) may attach to a first distributed gateway (D-GW), and configure a first Internet protocol (IP) address based on a prefix locally provided by the first D-GW. The WTRU may move and attach to a second D-GW while carrying out an on-going communication session with a correspondent node (CN). The WTRU may configure a second IP address based on a prefix provided by the second D-GW. The WTRU may use the first IP address for carrying out the on-going session and use the second IP address for a new communication session.

BRIEF DESCRIPTION OF THE DRAWINGS

A more detailed understanding may be had from the following description, given by way of example in conjunction with the accompanying drawings wherein:

FIGS. 5A and 5B, taken together, show an example flow diagram of a procedure for attaching a wireless transmit/receive unit (WTRU) to different D-GWs;

FIGS. 7A and 7B, taken together, show another example flow diagram of a procedure for attaching a WTRU to a D-GW;

FIGS. 10A and 10B, taken together, show an example of multiple operators anchoring in a network-based solution;

FIGS. 11A-11D, taken together, show an example flow diagram of a network-based procedure;

FIGS. 13A-13C, taken together, show an example flow diagram of a client-based procedure.

DETAILED DESCRIPTION

Figure 1A:
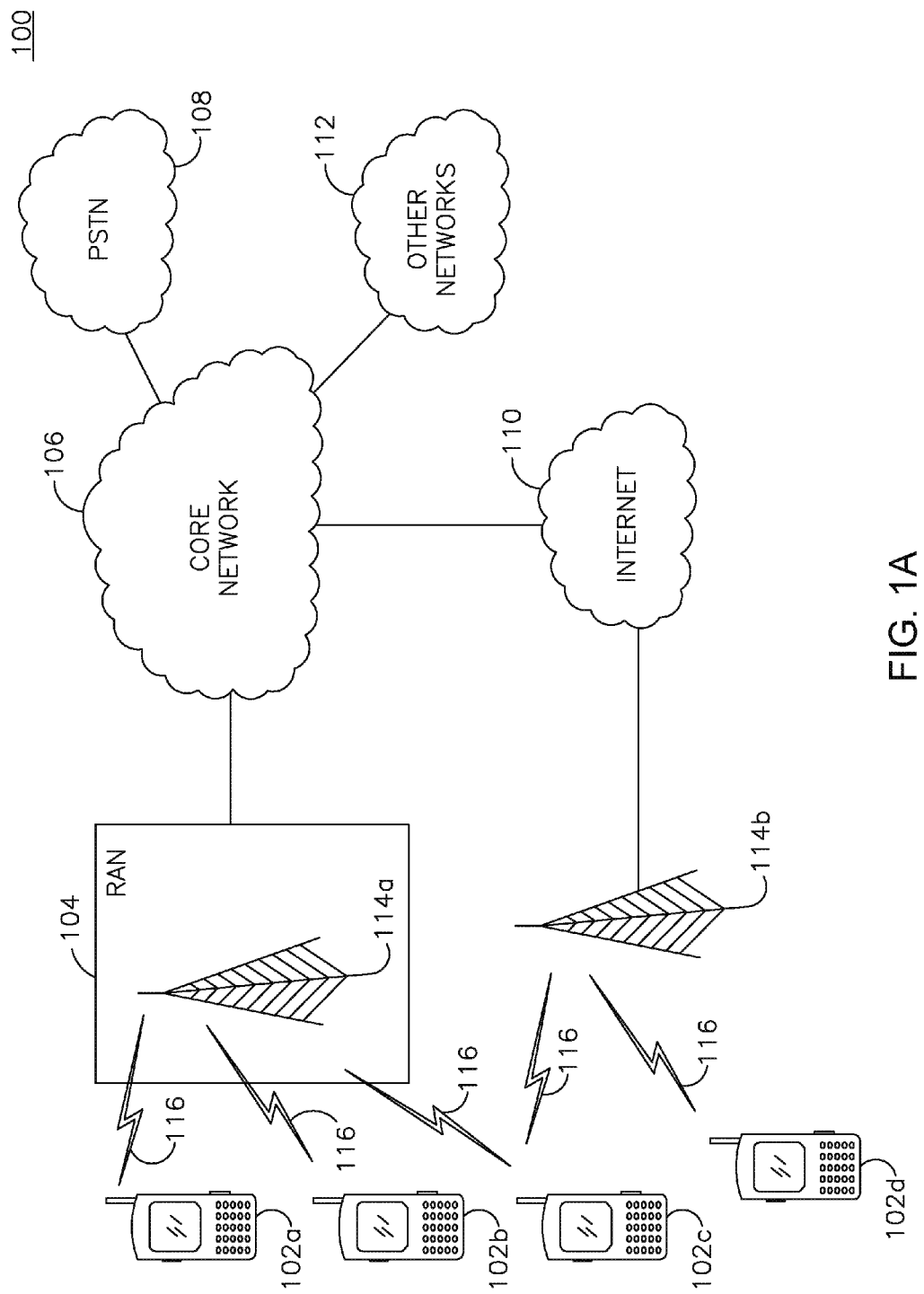
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
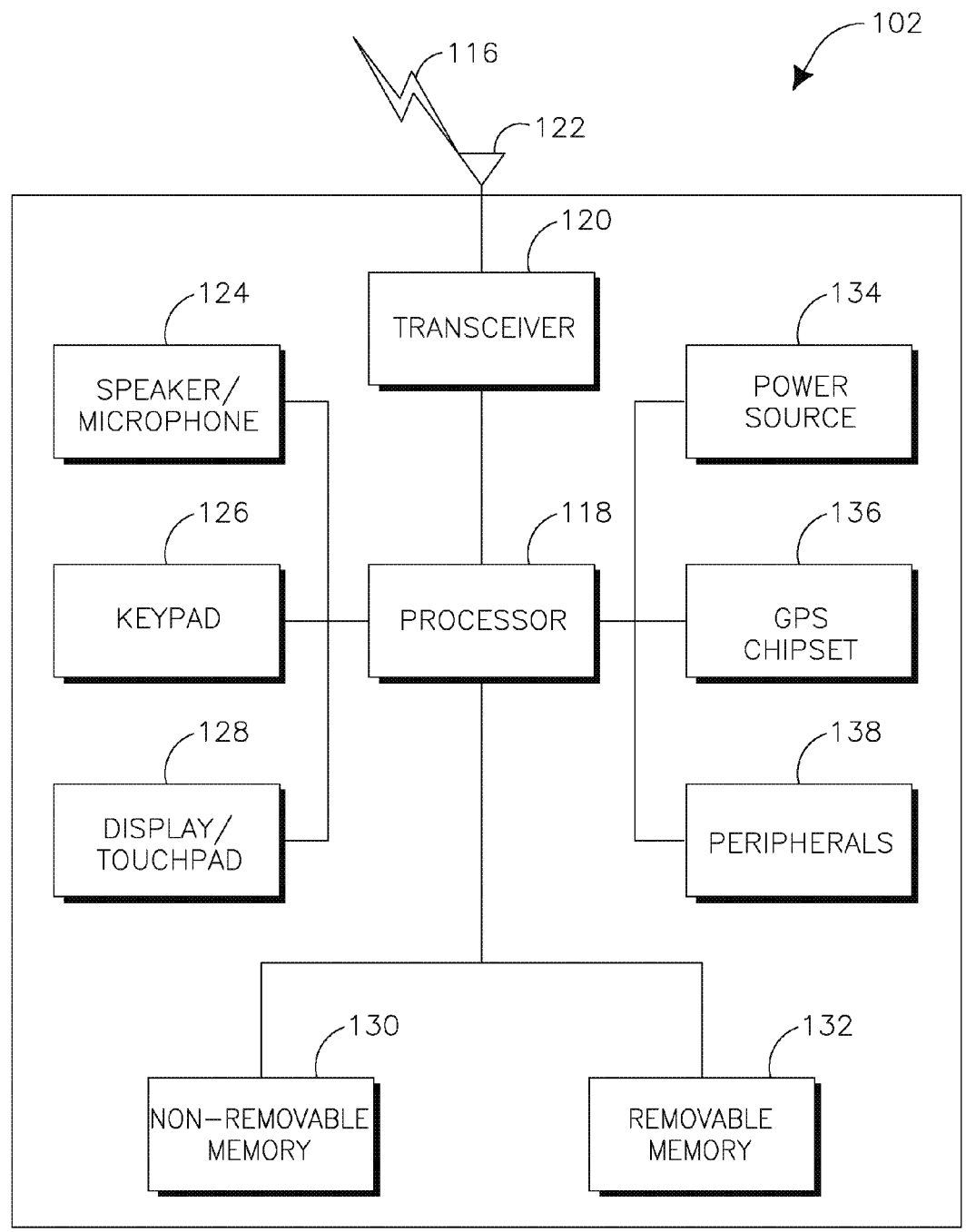
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, ITV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
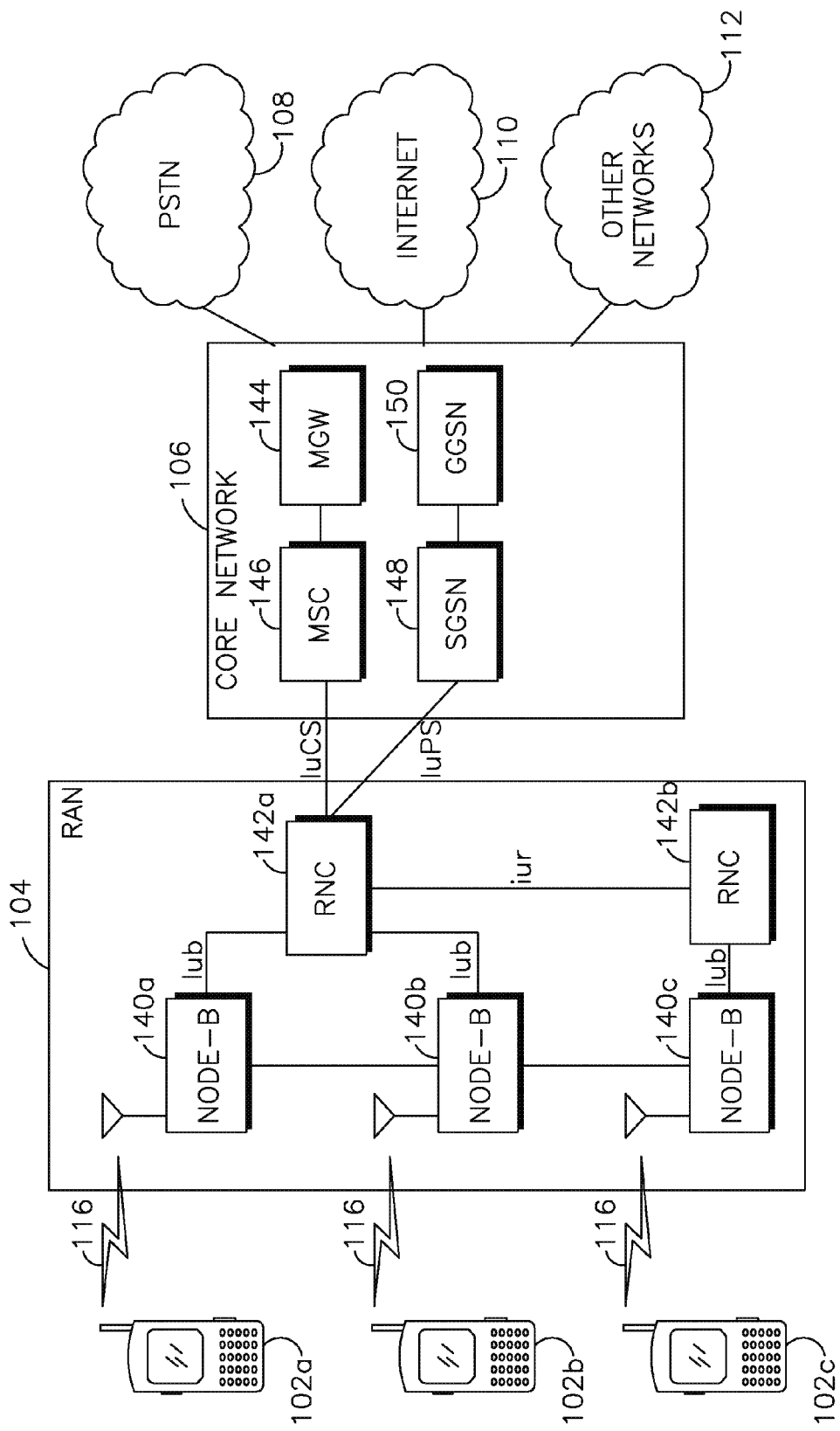
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. The RAN 104 may include any number of Node-Bs and RNCs.

As shown in FIG. 1C, the Node-Bs 140a, 140b may communicate with one another and with the RNC 142a via respective Iub interfaces. Additionally, the Node-B 140c may communicate with the RNC 142b via an Iub interface. Each of the RNCs 142a, 142b may be configured to control the respective Node-Bs 140a, 140b, 140c to which it communicates with. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

A packet-based network architecture definition described herein may be used to support advanced DMM features with multiple flows anchored at different gateways. The architecture definition may include definitions for nodes, functions and interfaces. A 3GPP EPS architecture may be used as a reference to describe the main concepts of the packet-based network architecture definition, and functions and interfaces are described as examples. The solution may include the operation when different flows are anchored at different gateways, as well as details on how a single D-GW may support virtualization of a single local service network across different mobile network operators (MNOs).

The WTRU operation may also be considered. Both the client and network-based DMM variants may be addressed, focusing on a network-based solution for the description of the operation with multiple flows anchored at different D-GWs.

The 3GPP EPS may be used as an example to describe the functionality of the nodes and interfaces described herein.

A distributed logical interface (DLIF), which is defined as a software construct that allows changing an anchor to a WTRU, is described herein. Extensions of information on a central node, (e.g., a home subscriber server (HSS)), to support WTRU mobility in a multi-anchor scenario is described herein. A method to manage multiple IP addresses when the WTRU is attached to multiple anchors is described herein.

A method to allow a WTRU have connectivity to a local network while roaming, and also make use of DMM features is described herein. A definition of new proxy mobile IP (PMIP) protocol messages and extensions to support the distributed anchoring is described herein. Extensions required to support inter-domain operation, for example, multiple operators are also described.

Different approaches to allow a WTRU having multiple flows anchored at different D-GWs are described herein. First, a network-based DMM solution is described herein, and then a client-based solution is described herein.

Figure 2:
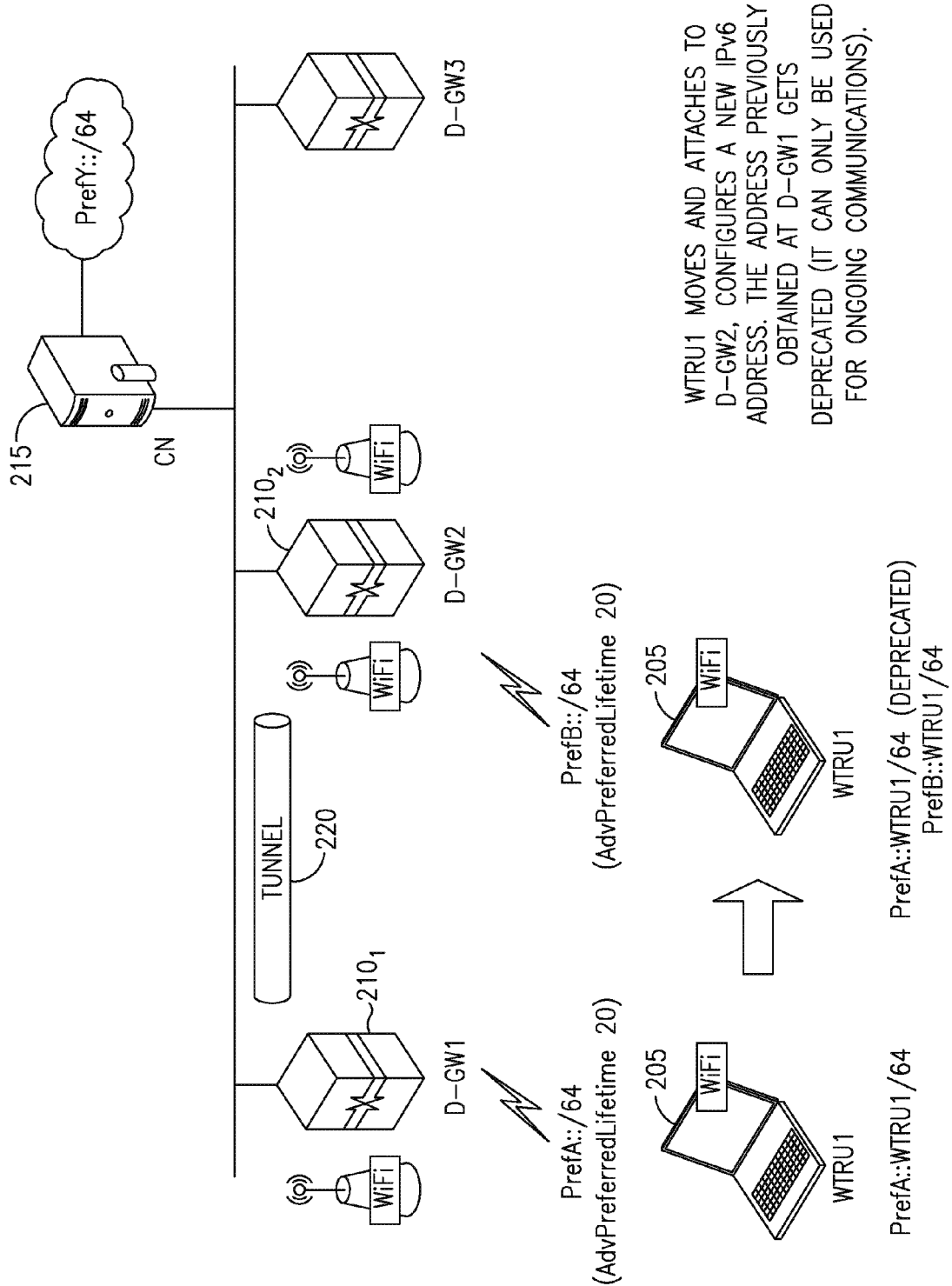
FIG. 2 shows an example of smart address selection with IPv6 deprecation based on lifetime expiration.

FIG. 2 is an example of smart address selection with IPv6 address deprecation based on lifetime expiration. As shown in FIG. 2, a WTRU 205 (WTRU1) may be attached to a first D-GW $210_1$ (D-GW1), and configure an IPv6 address (PrefA::WTRU1) out of a prefix locally provided by and anchored at D-GW $210_1$ (PrefA::/64). An IPv6 stateless address may include a prefix, (advertised by the local router in a router advertisement (RA) message, and an interface identifier assigned by the WTRU (e.g., a MAC address). Prefixes may be multicast (e.g., via a WLAN) or be directly assigned (e.g., in a 3GPP PDP context). The WTRU 105 may use that address for communications with a correspondent node (CN) 215. While data (IP) sessions that are currently using a specific IPv6 address are on-going, WTRU 205 may move and attach to a second D-GW $210_2$ (D-GW2), where it may auto-configure a new IPv6 address (PrefB::WTRU1), this time from a prefix provided by and anchored at D-GW $210_2$ (PrefB::/64). The goal may be to maintain existing on-going communications established with the address PrefA::WTRU1, while making WTRU 205 use the address PrefB::WTRU1 anchored at D-GW $210_2$ for all new communications (i.e., new sessions).

In order to enforce the use of the prefix locally anchored at the serving D-GW, the router advertisements may include a short prefix lifetime. The goal may be to deprecate the prefixes delegated by the D-GWs 210, which may no longer be serving the WTRU 205. When a prefix is advertised, it may include a lifetime. If the prefix expires, the WTRU 205 may not be able to use it any more for new sessions, but it may still keep using it for existing ones. Hence, advertising short lifetimes (e.g., t=0) may allow the WTRU 205 to obtain a new address (prefix) when attaching to a new router, and maintain the old one, but only for the duration of the ongoing session. Any new session may use the latest/newest address (prefix). The on-going communications may continue using the D-GW addresses, even if they are deprecated, so that this may affect new sessions.

The D-GWs 210 may be configured to advertise IPv6 prefixes with a short preferred lifetime to attaching WTRUs 205. This may have the direct consequence that the frequency of sending router advertisements (RAs) may be higher than the inverse of the advertised preferred lifetime. When the WTRU 205 moves, a bidirectional tunnel 220, via a proxy mobile IP (PMIP)v6/GPRS tunneling protocol (GTP), may be established between D-GW $210_1$ and D-GW $210_2$. The D-GW $210_1$ may modify its routing so that all traffic addressed to PrefA::/64 may be forwarded via the tunnel 220, while D-GW $210_2$ may modify its routing so that it may deliver that traffic to the locally attached WTRU 105. The D-GW $210_2$ may also establish a source-based route so that all the traffic transmitted by the WTRU 205 may be forwarded to the D-GW $210_1$ via the established tunnel.

One challenge of a network-based DMM solution may be allowing a WTRU to simultaneously transmit/receive traffic that is anchored at different D-GWs 210, and how to influence on the preference of the WTRU 205 selecting the source IPv6 address for a new communication, without requiring special support on the mobile node stack. A distributed logical interface (DLIF) may be defined, which is a software construct that may easily hide the change of anchor from the WTRU 205.

A logical interface (LIF) may provide a construct that allows reconfiguring or connecting multiple wireless physical (PHY) interfaces (IFs) to a single IP protocol stack. In this case, by using a DLIF, each (serving) D-GW 210 may expose itself towards each WTRU 205 as multiple routers, one per (active) anchoring D-GW 110.

Figure 3:
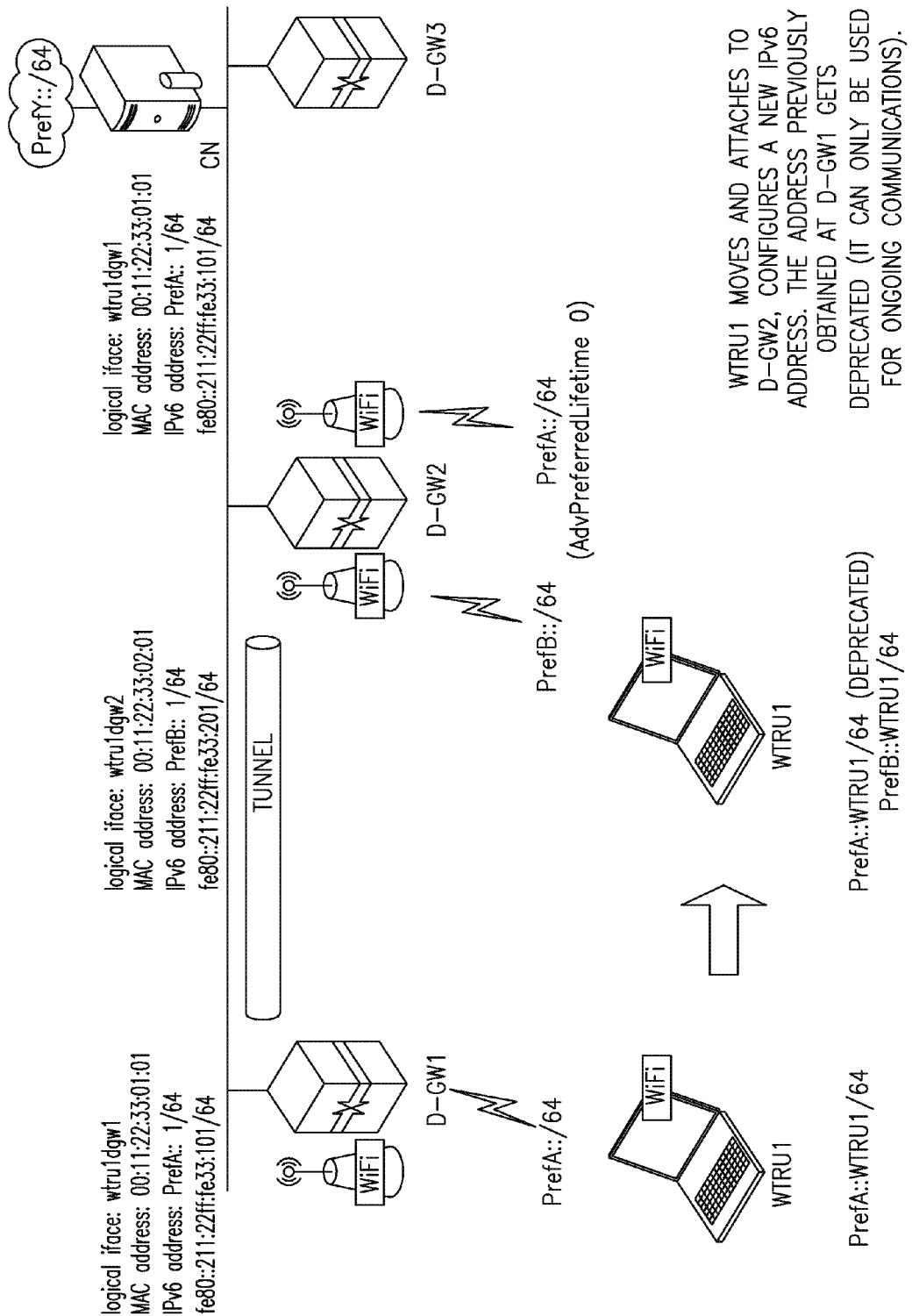
FIG. 3 shows an example of logical interfaces exposing multiple routers, (one per active anchor distributed gateway (D-GW))

FIG. 3 is an example of logical interfaces: exposing multiple routers. As shown in FIG. 3, WTRU1 may initially be attached to D-GW1, and configure an IPv6 address (PrefA::WTRU1) from a prefix locally anchored at D-GW1 (PrefA::/64). At this stage, D-GW1 may play both the role of an anchoring and serving D-GW, and it may also behave as a simple IP router. D-GW1 may create a logical interface to communicate with WTRU1, exposing itself as a (logical) router with a specific medium access control (MAC) (00:11:22:33:01:01) and IPv6 addresses (PrefA::1/64 and fe80:211:22ff:fe33:101/64) using the logical interface wtru1dgw1. These addresses may represent the "logical" identity of D-GW1 towards WTRU1, and may "follow" WTRU1 while roaming within the domain. The information required to configure this DLIF may be maintained on central node, such as a home subscriber server (HSS) or a central local mobility anchor (LMA).

If WTRU1 moves and attaches to different D-GWs of the domain (e.g., D-GW2 in FIG. 3), D-GW2 may create a new logical interface (wtru1dgw2) to expose itself towards WTRU1, providing it with a locally anchored prefix (PrefB::/64). In this case, since the CN, for example, the HSS has information about other active addresses used by WTRU1, and which D-GWs are anchoring to them, (identities, addresses, and the like), D-GW2 may also create additional logical interface(s) configured to exactly resemble the one(s) used by each of the active anchor D-GW(s) to communicate with WTRU1.

In this example, there may be only one active anchor D-GW (in addition to D-GW2, which is the serving one): D-GW1. Hence, only the logical interface wtru1dgw1 may be created. In order to maintain the prefix anchored at D-GW1 reachable, a tunnel between D-GW1 and D-GW2 may be established and the routing may be modified accordingly. This may be done by performing the required signaling, for example, PBU/PBA for the case of the PMIPv6-based solution. From a practical viewpoint, this may require source-based routing.

Figure 4:
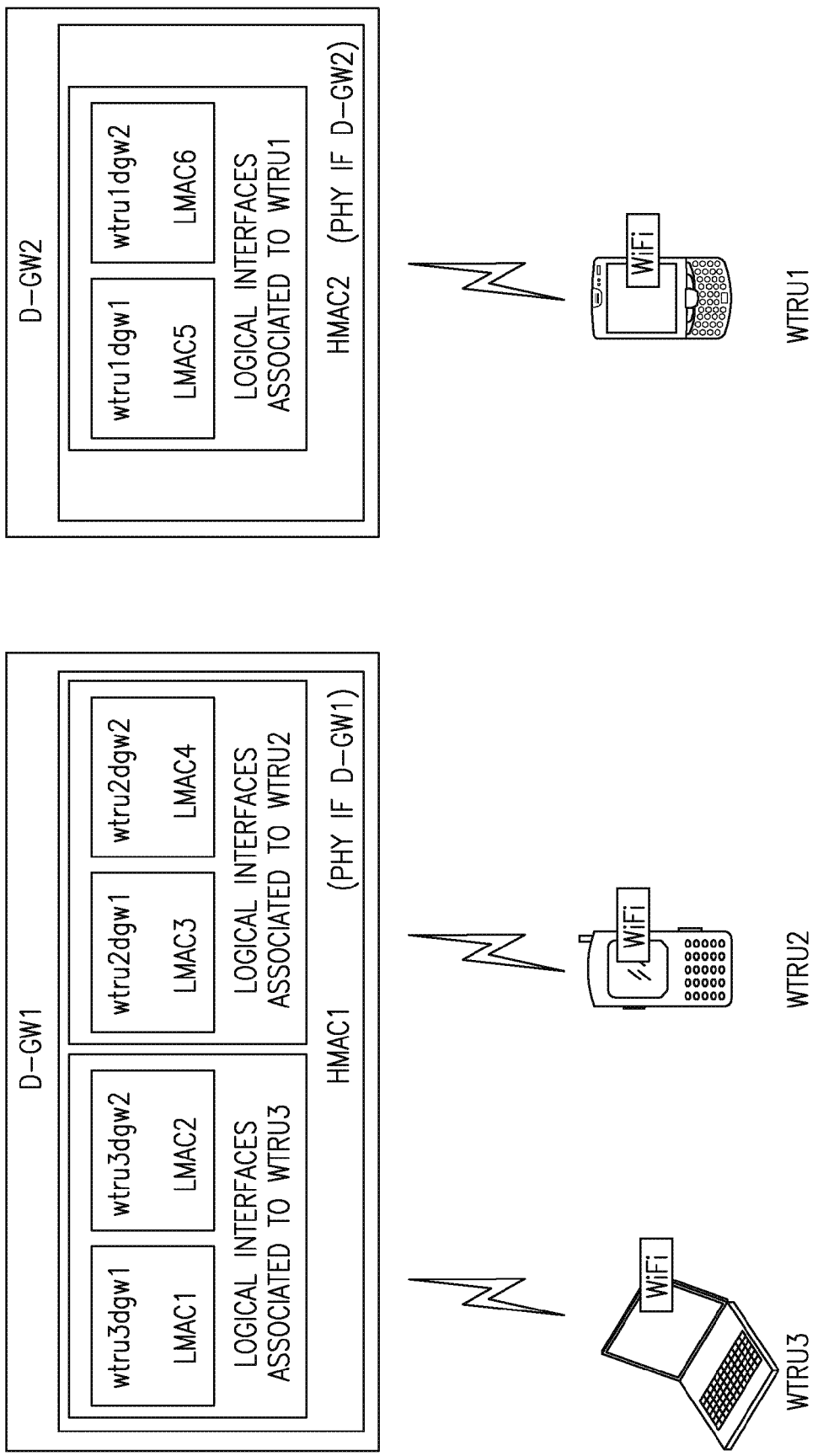
FIG. 4 shows an example D-GW logical interface concept.

FIG. 4 is an example of a D-GW logical interface concept. FIG. 4 illustrates two D-GWs (D-GW1 and D-GW2) and three WTRUs (WTRU1, WTRU2 and WTRU3). D-GW1 may be serving WTRU2 and WTRU3, while D-GW2 may be serving WTRU1. WTRU1, WTRU2 and WTRU3 may have two active anchoring D-GWs: D-GW1 and D-GW2. A serving D-GW may play the role of an anchoring D-GW for the attached, or served, WTRUs. Each D-GW may have one single wireless PHY IF.

Each WTRU may detect multiple logical routers—one per active anchoring D-GW, independent as to which serving D-GW the WTRU is currently attached to. From the point of view of the WTRU, these D-GWs may be portrayed as different routers, although the WTRU may be physically attached to one single interface. This may be achieved by the serving D-GW configuring different logical interfaces. Focusing on WTRU1, it may be attached to D-GW2, for example, as its serving D-GW, and, therefore, it may configure an IPv6 address from D-GW2's pool of locally anchored prefixes, for example, prefB::/64. D-GW2 may setup a logical interface, wtru1dgw2, on top of its wireless PHY IF D-GW2, which may be used to serve WTRU1. This interface may have a logical medium access control (LMAC) address, LMAC5, different from the hardware MAC address, HMAC2, of the wireless PHY IF of D-GW2. Over the wtru1dgw2 interface, D-GW2 may advertise its locally anchored prefix prefB::/64.

Before attaching to D-GW2, WTRU1 may visit D-GW1 and configure an address locally anchored at this D-GW, which may be used by the WTRU1 in active communications. WTRU1 may detect an interface connecting to D-GW1, as if it were directly connected to the two D-GWs. This may be achieved by the serving D-GW (D-GW1) configuring an additional distributed logical interface: wtru1dgw1, which may behave as the logical interface configured by the actual D-GW1 when WTRU1 was attached to it. This may indicate that both the MAC and IPv6 addresses configured on this logical interface remain the same, regardless of the physical D-GW which is serving the WTRU. The information required by a serving D-GW to properly configure this logical interface may be obtained in different ways: as part of the information conveyed in the proxy binding acknowledgement (PBA), from an external database, for example, the HSS, or by another mechanism.

As shown in FIG. 4, each D-GW may have at least one logical interface associated to each attached WTRU, since a serving D-GW may also be an anchoring D-GW for the attached WTRU.

Figure 5B:
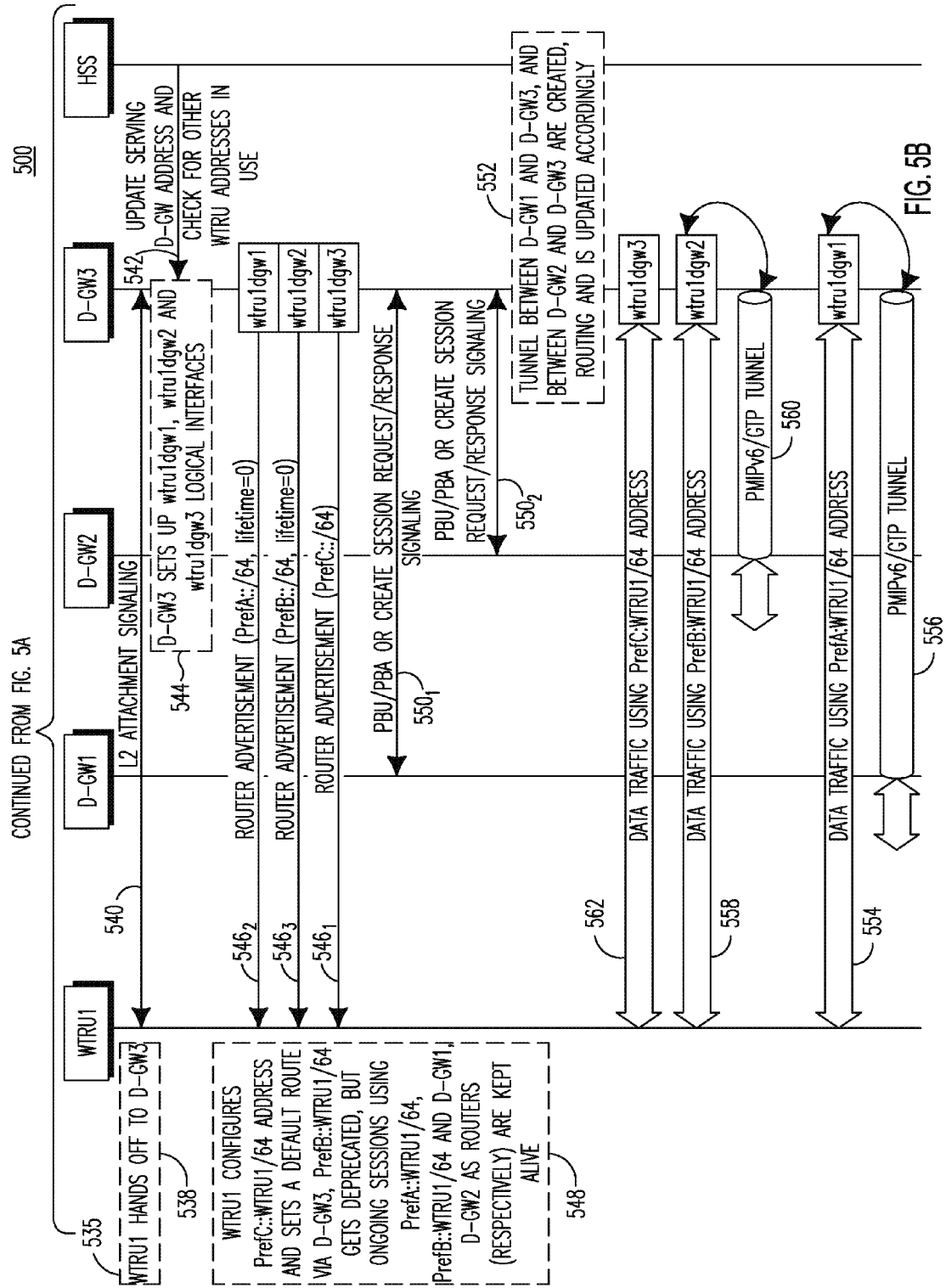

FIGS. 5A and 5B, taken together, show an example flow diagram of a procedure 500 of attaching a WTRU to a different D-GWs (e.g., attaches to D-GW1, then moves to D-GW2, and finally to D-GW3, while maintaining on-going connections using the IPv6 addresses anchored at the three D-GWs (D-GW1, D-GW2 and D-GW3).

As shown in FIG. 5A, WTRU1 may attach to D-GW1 (502). This event may be detected by D-GW1, based on layer 2 (L2) attachment signaling (504) or triggers. An IPv6 prefix from the pool of locally anchored prefixes may be selected by D-GW1 to be delegated to WTRU1 (PrefA::/64). D-GW1 may contact the HSS to perform a location update procedure, including the selected prefix, and subscriber data retrieval from the HSS (506). D-GW1 may obtain information about all the active IPv6 prefixes, anchored at other D-GWs, that the WTRU may be using, as well as the information required to be able to guarantee the reachability of these prefixes at the current location. This information may include, for each anchoring D-GW, the MAC and link-local IPv6 addresses exposed on the logical ingress interface of the D-GW, and IPv6 address, and/or additional info needed to setup a GTP tunnel, if the GTP solution is used, of the D-GW to setup the bidirectional tunnel. In this case, there may be no other active prefix being used by the D-GW, for example, initial attachment.

D-GW1 may set up a logical interface aimed at interfacing with WTRU1, called wtru1dgw1 (508). The logical interface wtru1dgw1 may be used by D-GW1 to advertise the locally anchored prefix (PrefA::/64) to WTRU1 (510). Using this prefix, WTRU1 may configure an IPv6 address (PrefA::WTRU1/64) that may be used in new communications, which may be anchored at D-GW1 (512). Data traffic using the address PrefA::WTRU1 may be received at the interface wtru1dgw1 (514) and directly forwarded by D-GW1 towards its destination. WTRU1 may perform a handover to D-GW2 (516). This event may be detected by D-GW2 via L2 attachment signaling (518).

An IPv6 prefix may be selected by D-GW2 from a pool of locally anchored prefixes to be delegated to WTRU1 (PrefB::/64). D-GW2 may contact the HSS to perform a location update procedure, including the selected prefix, and subscriber data retrieval from the HSS (520). D-GW2 may obtain information about all the active IPv6 prefixes, anchored at other D-GWs, that the WTRU may be using, as well as the information required to be able to guarantee the reachability of these prefixes at the current location. In this case, WTRU1 may be using PrefA::/64 (anchored at D-GW1).

D-GW2 may set up two logical interfaces aimed at interfacing with WTRU1, called wtru1dgw2 and wtru1dgw1 (522). The first one (wtru1dgw2) may portray the D-GW2 as an anchoring D-GW and it may therefore be used for communications using PrefB::/64 (524). The second one (wtru1dgw1) may used to logically emulate D-GW1, even though WTRU1 is no longer physically attached to D-GW1 (526). The information needed to configure wtru1dgw1 so it resembles exactly the interface at D-GW1 may be obtained from the HSS.

The logical interface wtru1dgw2 may be used by D-GW2 to advertise the locally anchored prefix (PrefB::/64) to WTRU1 (524). Using this prefix, WTRU1 configures an IPv6 address (PrefB::WTRU1/64) that may be used in new communications, which may be anchored at D-GW2 (528). Similarly, the logical interface wtru1dgw1 may be used by D-GW2 to advertise to WTRU1 the prefix anchored at D-GW1 (PrefA::/64) (526), but with a zero lifetime, to deprecate the address previously configured by WTRU1 (PrefA::WTRU1/64), so that it is not used in new communications (528).

D-GW2, using the information obtained from the HSS, may transmit a proxy binding update (PBU) or a create session request if the GTP solution may be used, to signal to D-GW1 that WTRU1 has moved and that a bi-directional tunnel has to be setup so the reachability of the prefix anchored at D-GW1 and used by WTRU1 may be maintained (530). A PBA/create session response may be transmitted in response. A tunnel may be created, and the routing may be updated accordingly at both ends of the tunnel (532). This means that D-GW2 may insert a source-based route, so that all traffic with source address PrefA::/64 may be transmitted via the tunnel, and that D-GW1 inserts a route pointing towards the tunnel to reach PrefA::/64. This tunnel may be created on a per-WTRU basis, so different traffic management policies may be applied to different traffic. Alternatively, tunnels between D-GWs may be re-used.

Traffic using the address PrefB::WTRU1 may be received at the interface wtru1dgw2 and directly forwarded by D-GW2 towards its destination (532). Traffic using the address PrefA::WTRU1 may be received at the interface wtru1dgw1 (534) and forwarded via the tunnel 536 between D-GW1 and D-GW2.

As shown in FIG. 5B, WTRU1 may perform a handover to D-GW3 (538). This event may be detected by D-GW3 (540). An IPv6 prefix may be selected by D-GW3 from a pool of locally anchored prefixes to be delegated to WTRU1 (PrefC::/64). D-GW3 may contact the HSS to perform a location update procedure, including the selected prefix, and subscriber data retrieval from the HSS (542). D-GW3 may obtain information about all of the active IPv6 prefixes, anchored at other D-GWs, that the WTRU may be using, as well as the information required to be able to guarantee the reachability of these prefixes at the current location. In this case, WTRU1 may be using both PrefA::/64, anchored at D-GW1, and PrefB::/64, anchored at D-GW2.

D-GW3 may set up three logical interfaces aimed at interfacing with WTRU1, called wtru1dgw3, wtru1dgw1 and wtru1dgw2 (544). The first one, wtru1dgw3, may portray the D-GW3 as an anchoring D-GW and may therefore be used for communications using PrefC::/64 (546$_1$). The second one, wtru1dgw1, may be used to logically emulate D-GW1, even though WTRU1 is no longer physically attached to D-GW1 (546$_2$). Analogously, the third one, wtru1dgw2, may be used to logically emulate D-GW2 (546$_3$). The information needed to configure wtru1dgw1 and wtru1dgw2 so they resemble exactly the interfaces at D-GW1 and D-GW2 may be obtained from the HSS.

The logical interface wtru1dgw3 may be used by D-GW3 to advertise the locally anchored prefix (PrefC::/64) to WTRU1 (546$_1$). Using this prefix, WTRU1 may configure an IPv6 address (PrefC::WTRU1/64) that may be used in new communications, which may be anchored at D-GW3 (548). Similarly, the logical interface wtru1dgw1 may be used by D-GW3 to advertise to WTRU1 the prefix anchored at D-GW1 (PrefA::/64), but with a zero lifetime, to deprecate the address previously configured by WTRU1 (PrefA::WTRU1/64), so that it is not used in new communications (546$_2$). The same may be done for PrefB::/64 through wtru1dgw2 (546$_3$).

D-GW3, using the information obtained from the HSS, may transmit a PBU or a create session request if the GTP solution may be used, to signal to D-GW1 and D-GW2 that WTRU1 has moved and that bi-directional tunnels may be setup/updated so the reachability of the prefixes anchored at D-GW1 and D-GW2 used by WTRU1 may be maintained, and a PBA/create session response message may be transmitted in response (550$_1$, 550$_2$). Two tunnels may be created/updated, and the routing may be updated accordingly at both ends of each of the tunnels (552). Thus, D-GW3 may insert a source-based route, so that all traffic with source address PrefA::/64 (554) may be transmitted via the tunnel 556 with D-GW1, and another a source-based route, so that all traffic with source address PrefB::/64 (558) may be transmitted via the tunnel 560 with D-GW2. D-GW1 may update the routing so that traffic to PrefB::/64 may be transmitted via the tunnel 556 with D-GW3. Analogously, D-GW2 may update the routing so that traffic to PrefB::/64 may be transmitted via the tunnel 560 with D-GW3.

Traffic using the address PrefC::WTRU1 may be received at the interface wtru1dgw3 and directly forwarded by D-GW3 towards its destination (562). Traffic using the address PrefA::WTRU1 may be received at the interface wtru1dgw1 and forwarded via the tunnel 556 between D-GW1 and D-GW3. Traffic using the address PrefB::WTRU1 may be received at the interface wtru1dgw2 and forwarded via the tunnel 560 between D-GW2 and D-GW3.

The use of default router preferences for maintaining local access while roaming, which is the most complete and meets all identified requirements, may be an extension of the above solution, exploiting further the idea of logical interfaces at the D-GWs, where each one may represent a unique "logical D-GW" on a per-WTRU and per physical D-GW basis. In this case, the solution may be extended to support a kind-of local IP access (LIPA) mobility scenario. For example, a local IP network may be provided by a given D-GW and the resources available at that network may not be reached from outside the local network, (e.g., may not be accessed by a WTRU attached to D-GW3). The goal may be to allow a WTRU to be able to roam while still being able to have connectivity to this local IP network. The solution adopted to support this case is the use of default router preferences of more specific routes when the WTRU moves to a D-GW different from the one providing access to the local IP network, for example D-GW1. These routes may be advertised through the logical interface representing the D-GW providing access to the local network, for example D-GW1. In this way, if WTRU1 moves from D-GW1 to D-GW2, any active session that WTRU1 may have with a node of the local network connected to D-GW1 may survive, being the traffic forwarded via the tunnel between D-GW1 and D-GW2. Also, any potential future connection attempt towards the local network may be supported, even though the WTRU may no longer be attached to D-GW1.

Figure 6:
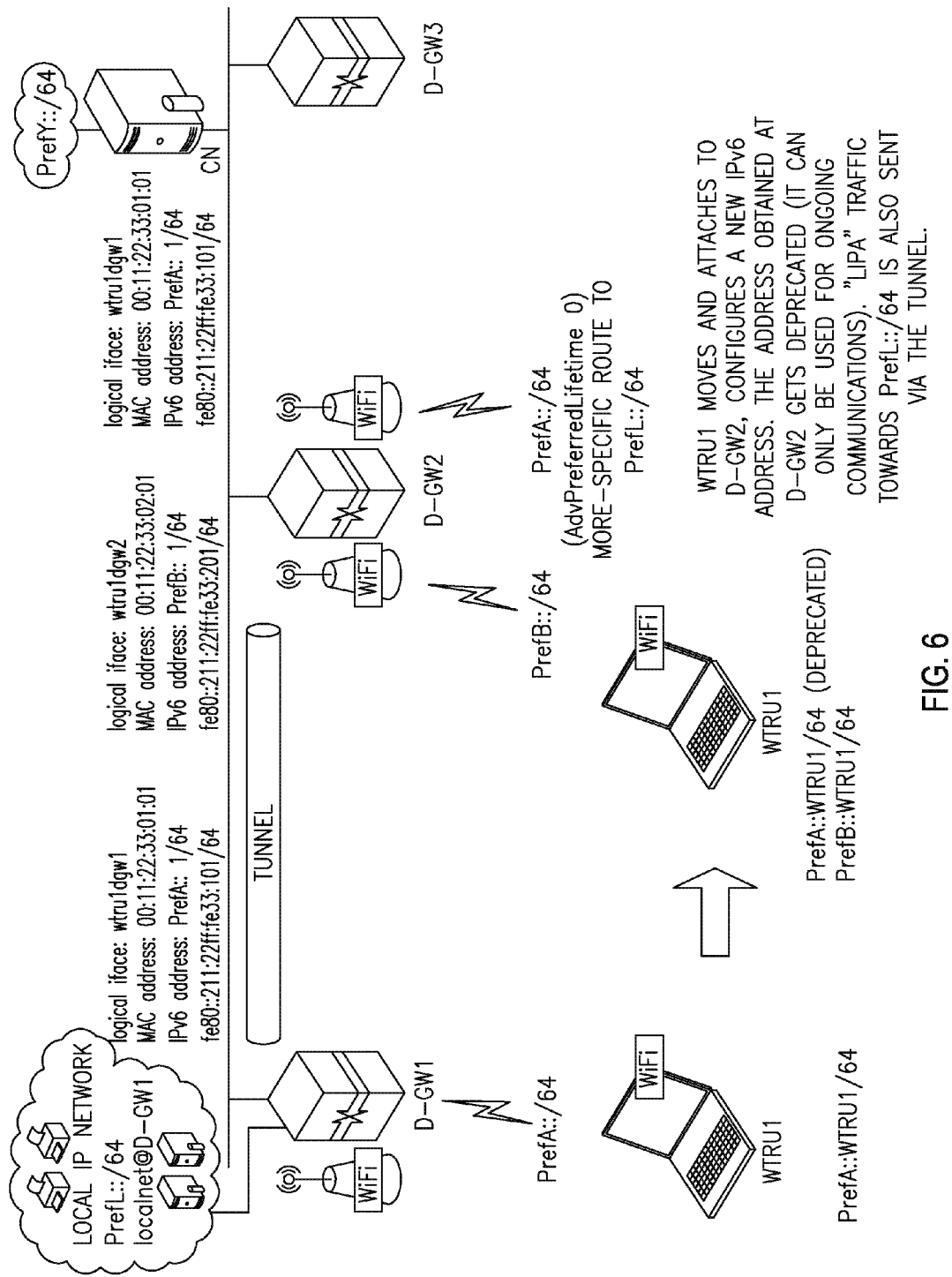
FIG. 6 shows an example of logical interfaces exposing multiple routers (one per active anchor D-GW)

As shown in FIG. 6, WTRU1 may initially attach to D-GW1, configuring an IPv6 address (PrefA::WTRU1/64) from a prefix locally anchored at D-GW1 (Pref::/64). At this stage, D-GW1 may both play the role of an anchoring and serving D-GW. D-GW1 may create a logical interface to communicate, point-to-point link, with WTRU1, exposing itself as a logical router with a specific MAC (00:11:22:33:01:01) and IPv6 addresses (PrefA::1/64 and fe80:211:22ff:fe33:101/64). If the WTRU moves and attaches to a different D-GW of the domain, for example, D-GW2, this D-GW may create a new logical interface to expose itself towards WTRU1, providing it with a locally anchored prefix (PrefB::/64). D-GW2 may also create an additional logical interface configured to exactly resemble the one used by the active anchor D-GW to communicate with WTRU1, D-GW1 in this example. In order to maintain the prefix anchored at D-GW1 reachable, a tunnel between D-GW1 and D-GW2 may be established and the routing may be modified accordingly. This may be done by performing the required signaling, for example, PBU/PBA for the case of the PMIPv6-based solution. There may be a local IP network attached to D-GW1 that is only reachable via D-GW1, kind-of LIPA scenario.

WTRU1 may be able to connect to that network, which uses an address from the prefix PrefL::/64 in this example, while connected to D-GW1, for example, while using the address PrefA::WTRU1. However, in this case, it is also desirable that WTRU1 may not only keep on-going connections with devices of this network after moving to a different D-GW, but also that WTRU1 may connect to this network at any moment afterwards. In order to do so, serving D-GWs may not only advertise prefixes anchored at other D-GWs with a zero lifetime, but may also include route information options to advertise specific routes to the local networks that are only reachable via other anchoring D-GWs. This means that D-GW2 may advertise, in the Router Advertisements sent via the logical interface wtru1dgw1, a route towards PrefL::/64. WTRU1, based on the received RAs, may deprecate the IPv6 address PrefA::WTRU1, so it is only used while there are on-going communications, and may introduce a specific route towards PrefL::/64. New communications may use the address configured from the prefix anchored at D-GW2 (PrefB::WTRU1).

An alternative design approach may be not to deprecate the addresses anchored at other D-GWs, but keep advertising them and adjust default router preferences values. By doing this, any of the configured IPv6 address of the WTRU, the ones anchored at the serving D-GW and at the other anchoring D-GWs, may be used as source address for new communications. In this case, to enforce that the current serving D-GW may be the one used for new communications, with the exception of the ones destined to a local network only reachable via another D-GW, the source address selection mechanism may be smart enough to select the right IPv6 address for each possible case. However, current specified mechanisms, for example, IPv6 default address selection, may not support this. On the other hand, considering again the approach of deprecating addresses, it may make the management of the configured IPv6 addresses easier, but it may also imply that an address anchored by a previously visited D-GW is not selected for communications to a local network only reachable via that particular D-GW, IPv6 default address selection requires that deprecated addresses may not be used as source address for new communications.

In the example of FIG. 6, WTRU1 may not automatically select as source address PrefA::WTRU1 when using a more-specific route that is advertised by the router advertising the prefix PrefA::/64. Actually, WTRU1 may perfectly select as source address PrefB::WTRU2, which is not the best approach for this case. There may be different possible approaches to address this.

In a first approach, WTRU1 may modify/extend the current source address selection mechanisms, IPv6 default address selection, to allow taking into consideration the next-hop determination into the address selection process. This may already be a problem identified by default address selection. The required modification may be the following: "choose as source address the one configured from the prefix advertised by the router announcing the specific route used to reach the destination".

In a second approach, WTRU1 may make use of IPv6 default address selection in a dynamic way, configuring it in such a way that the right source IPv6 address may be selected when trying to reach a local network only reachable via a specific D-GW and therefore advertised as a specific route by the current serving D-GW. A required functionality may be the automatic distribution and update of the policy tables, though there are already some mechanisms proposed to do so with DHCPv6 and Router Advertisements.

Figure 7B:
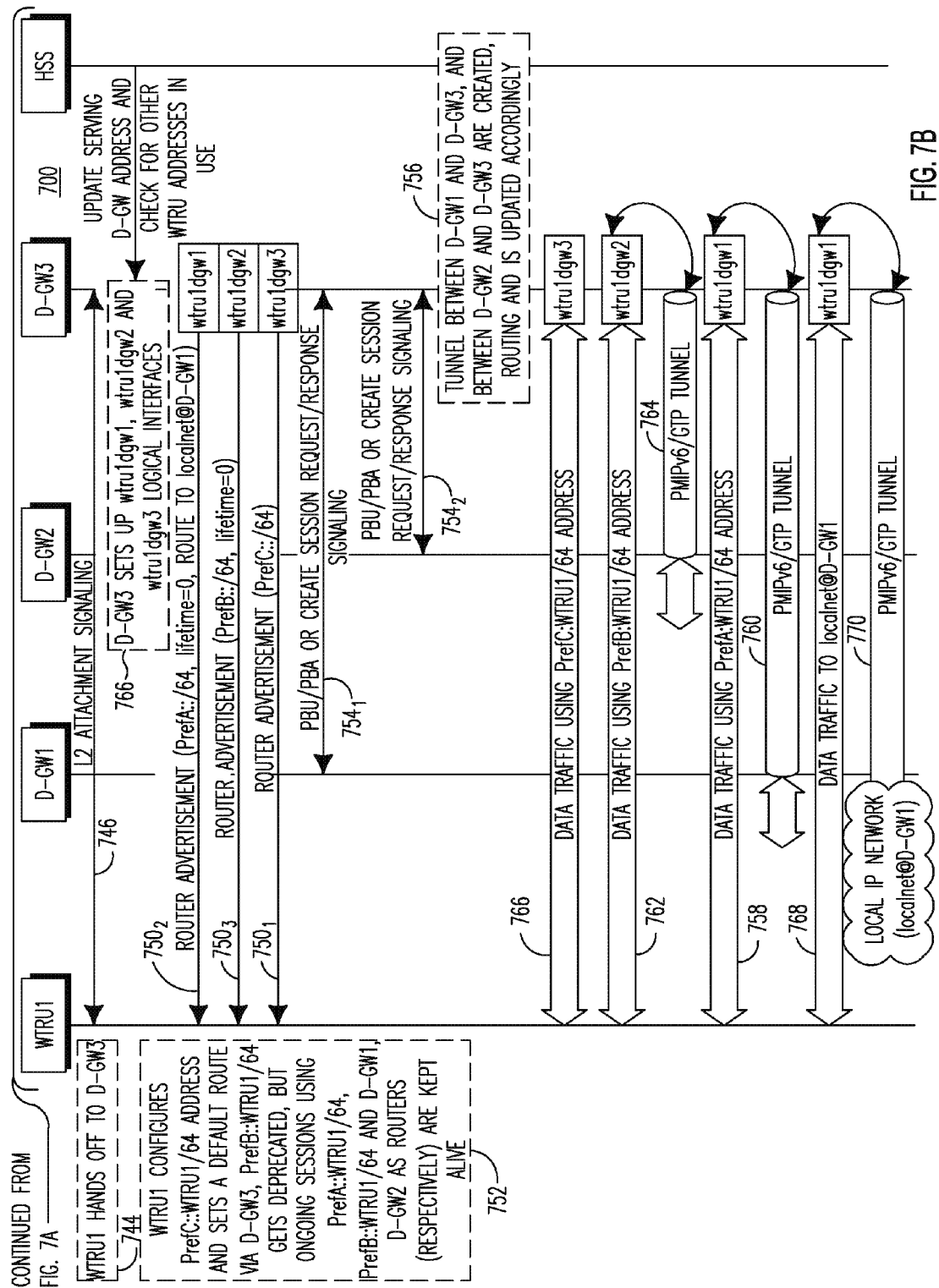

FIGS. 7A and 7B, taken together, shows an example flow diagram of a procedure 700 using default router preferences of specific routes, whereby different actions and messages are exchanged when WTRU1 attaches to D-GW1, then moves to D-GW2 and finally moves to D-GW3, while keeping on-going connections using the IPv6 addresses anchored at the three D-GWs.

As shown in FIG. 7A, WTRU1 may attach to D-GW1 (702). This event may be detected by D-GW1, based on L2 attachment signaling (704) or triggers. An IPv6 prefix may be selected by D-GW1 from a pool of locally anchored prefixes to be delegated to WTRU1 (PrefA::/64). D-GW1 may contact the HSS to perform a location update procedure, including the selected prefix, and subscriber data retrieval from the HSS (706). D-GW1 may obtain information about all the active IPv6 prefixes, anchored at other D-GWs, that the WTRU may be using, as well as the information required to be able to guarantee the reachability of these prefixes at the current location. This information may include, for each anchoring D-GW: the MAC and link-local IPv6 addresses exposed on the logical ingress interface of the D-GW, and IPv6 address, and/or additional info needed to setup a GTP tunnel, if the GTP solution is used, of the D-GW to setup the bidirectional tunnel. In this case, there may be no other active prefix being used by the D-GW, for example, initial attachment.

D-GW1 may set up a logical interface aimed at interfacing with WTRU1, called wtru1dgw1 (708). Traffic using the address PrefA::WTRU1 may be received at the interface wtru1dgw1 and directly forwarded by D-GW1 towards its destination. Traffic between WTRU1 and the local network reachable via D-GW1 (localnet@D-GW1) may be handled normally by D-GW1, as WTRU1 may be locally attached.

The logical interface wtru1dgw1 may be used by D-GW1 to advertise the locally anchored prefix (PrefA::/64) to WTRU1 (710). Using this prefix, WTRU1 may configure an IPv6 address (PrefA::WTRU1/64) that may be used in new communications, which may be anchored at D-GW1 (712). WTRU1 may perform a handover to D-GW2 (714). This event may be detected by D-GW2 via L2 attachment signaling (716).

An IPv6 prefix may be selected by D-GW2 from a pool of locally anchored prefixes to be delegated to WTRU1 (PrefB::/64). D-GW2 may contact the HSS to perform a location update procedure, including the selected prefix, and subscriber data retrieval from the HSS (718). D-GW2 may obtain information about all the active IPv6 prefixes, anchored at other D-GWs, that WTRU1 may be using, as well as the information required to be able to guarantee the reachability of these prefixes at the current location. In this case, WTRU1 may be using PrefA::/64, anchored at D-GW1.

D-GW2 may set up two logical interfaces aimed at interfacing with WTRU1, called wtru1dgw2 and wtru1dgw1 (720). The first one, wtru1dgw2, may portray the D-GW2 as anchoring D-GW and it may therefore be used for communications using PrefB::/64 (722). The second one, wtru1dgw1, may be used to logically emulate D-GW1, even though WTRU1 is no longer physically attached to D-GW1 (724).

The information needed to configure wtru1dgw1 so it resembles exactly the interface at D-GW1 may be obtained from the HSS.

The logical interface wtru1dgw2 may be used by D-GW2 to advertise the locally anchored prefix (PrefB::/64) to WTRU1 (722). Using this prefix, WTRU1 may configure an IPv6 address (PrefB::WTRU1/64) that may be used in new communications, which may be anchored at D-GW2 (726). Similarly, the logical interface wtru1dgw1 may used by D-GW2 to advertise to WTRU1 the prefix anchored at D-GW1 (PrefA::/64) (724), but with a zero lifetime (724), to deprecate the address previously configured by WTRU1 PrefA::WTRU1/64, so it is not used in new communications (726). D-GW2 may also advertise via wtru1dgw1 a default router preference specific route, using the route information option, to localnet@D-GW1 (724).

D-GW2, using the information obtained from the HSS, may transmit a PBU or a create session request if the GTP solution is used, to signal to D-GW1 that WTRU1 has moved and that a bi-directional tunnel may have to be setup so the reachability of the prefix anchored at D-GW1 used by WTRU1 may be maintained, and a PBA/create session response may be transmitted in response (728). A tunnel may be created, and the routing may be updated accordingly at both ends of the tunnel (730). Thus, D-GW2 may insert a source-based route, so that all traffic with source address PrefA::WTRU1/64 may be transmitted via the tunnel, and that D-GW1 may insert a route pointing towards the tunnel to reach PrefA::/64 (732). This tunnel may be created on a per-WTRU basis, so different traffic management policies may be applied to different traffic. Alternatively, tunnels between D-GWs may be re-used.

Traffic using the address PrefB::WTRU1 may be received at the interface wtru1dgw2 and directly forwarded by D-GW2 towards its destination (734). Traffic using the address PrefA::WTRU1 may be received at the interface wtru1dgw1 and forwarded via the tunnel 736 between D-GW1 and D-GW2. Traffic between WTRU1 and localnet@D-GW1 (738) may be forwarded via a tunnel 740. Localnet@D-GW1 may not be reached from anywhere in the Internet, but only via D-GW1 (742).

As shown in FIG. 7B, WTRU1 may perform a handover to D-GW3 (744). This event may be detected by D-GW3 via L2 attachment signaling (746). An IPv6 prefix may be selected by D-GW3 from a pool of locally anchored prefixes to be delegated to WTRU1 (PrefC::/64). D-GW3 may contact the HSS to perform a location update procedure, including the selected prefix, and subscriber data retrieval from the HSS. D-GW3 may obtain information about all the active IPv6 prefixes, anchored at other D-GWs, that WTRU1 may be using, as well as the information required to be able to guarantee the reachability of these prefixes at the current location. In this case, WTRU1 may be using both PrefA::/64, anchored at D-GW1, and PrefB::/64, anchored at D-GW2.

D-GW3 may set up three logical interfaces aimed at interfacing with WTRU1, called wtru1dgw3, wtru1dgw1 and wtru1dgw2 (748). The first one, wtru1dgw3, may portray the D-GW3 as anchoring D-GW and it may therefore be used for communications using PrefC::/64 (750$_1$). The second one, wtru1dgw1, may be used to logically emulate D-GW1, even though WTRU1 is no longer physically attached to D-GW1 (750$_2$). Analogously, the third one, wtru1dgw2, may be used to logically emulate D-GW2 (750$_3$). The information needed to configure wtru1dgw1 and wtru1dgw2 so that they resemble exactly the interfaces at D-GW1 and D-GW2 may be obtained from the HSS.

The logical interface wtru1dgw3 may be used by D-GW3 to advertise the locally anchored prefix (PrefC::/64) to WTRU1 (750$_1$). Using this prefix, WTRU1 configures an IPv6 address (PrefC::WTRU1/64) that may be used in new communications, which may be anchored at D-GW3 (752). Similarly, the logical interface wtru1dgw1 may be used by D-GW3 to advertise to WTRU1 the prefix anchored at D-GW1 (PrefA::/64), but with a zero lifetime, to deprecate the address previously configured by WTRU1 PrefA::WTRU1/64, so it is not used in new communications (750$_2$, 752). The router advertisements transmitted by D-GW3 via the logical interface wtru1dgw1 may also include the specific route towards localnet@d-GW1. The logical interface wtru1dgw2 may be used by D-GW3 to advertise to WTRU1 the prefix anchored at D-GW2 (PrefB::/64), but with a zero lifetime, to deprecate the address previously configured by WTRU1 PrefB::WTRU1/64, so it is not used in new communications (750$_3$, 752).

D-GW3, using the information obtained from the HSS, may transmit a PBU, or a create session request, if the GTP solution is used, to signal to D-GW1 and D-GW2 that WTRU1 has moved and that bi-directional tunnels may have to be setup so the reachability of the prefixes anchored at D-GW1 and D-GW2 used by WTRU1 may be maintained, and PBA/create session response messages may be transmitted in response (754$_1$, 754$_2$). Two tunnels may be created, and the routing may be updated accordingly at both ends of each of the tunnels (756). Thus, D-GW3 may insert a source-based route, so that all traffic with source address PrefA::WTRU1/64 (758) may be transmitted via the tunnel 760 with D-GW1, and another source-based route, so that all traffic with source address PrefB::WTRU1/64 (762) may be transmitted via the tunnel 764 with D-GW2. D-GW1 may update the routing so that traffic to PrefA::/64 (58) may be transmitted via the tunnel 760 with D-GW3. Analogously, D-GW2 may update the routing so traffic to PrefB::/64 (762) may be transmitted via the tunnel 764 with D-GW3.

Traffic using the address PrefC::WTRU1 (766) may be received at the interface wtru1dgw3 and directly forwarded by D-GW3 towards its destination. Traffic using the address PrefA::WTRU1 (758) may be received at the interface wtru1dgw1 and forwarded via the tunnel 760 between D-GW1 and D-GW3. Traffic using the address PrefB::WTRU1 (762) may be received at the interface wtru1dgw2 and forwarded via the tunnel 764 between D-GW2 and D-GW3. Traffic between WTRU1 and the localnet@D-GW1 (768) may be forwarded via the tunnel 770 between D-GW3 and D-GW1.

From an implementation point of view, there may already be support in several operating systems (OSs) for the creation of different logical interfaces over the same physical one. Each logical interface may appear as a regular interface to the OS, and it may support configuring the MAC address exposed by the logical interface. The destination MAC address may be actually what is used by the OS to decide which logical interface processes an incoming L2 frame.

The DLIF concept may be easily implemented using features that are usually available on several OSs. Among the possible mechanisms that may be used to do it, the Linux macvlan support may allow the creation of different logical interfaces over the same physical one. Each logical interface may appear as a regular interface to the Linux OS, which may be configured normally, and it may support configuring the MAC address exposed by the logical interface. The destination MAC address may be used by the OS to decide which logical interface, configured on top of a wireless PHY IF, may be in charge of processing an incoming L2 frame.

A prototype of the DLIF concept may use Linux macvlan support, the radvd daemon, the Linux Advanced Routing and Traffic Control features and the standard iproute2 collection of utilities.

Macvlan support maybe used to enable iproute2 tools to be able to create, destroy and configure DLIFs on demand over a single wireless PHY IF. One of the features that may need to be configured is the logical MAC address exposed by the DLIF, as well as the IPv6 addresses, since they may remain the same regardless of the serving D-GW where the DLIF is configured.

Since the distributed logical interfaces created using the macvlan support appear as regular network interfaces, they may be used normally in the radvd configuration file. By dynamically modifying the radvd configuration file and reloading it, the router advertisements transmitted to each WTRU, for example, advertizing new IPv6 prefixes, deprecating prefixes anchored at other serving D-GWs, announcing default router preferences specific routes or changing router preferences, may be controlled.

Each time a DLIF is created, it may also need to properly configure source-based IPv6 routes, as well as tunnels in the case of handover. This may be supported by the Linux Advanced Routing and Traffic Control features.

An example solution when multiple flows are anchored at different D-GWs may be presented. In a mobile IPv6 (MIPv6) solution, the WTRU may obtain an address at each visited D-GW. This address may play both the role of home address, address anchored at the serving D-GW, which may used for new communications, and care of address (CoA) used to keep the reachability of addresses that are still being used and were configured at previously visited D-GWs. The D-GWs may have to play the role of home agents, in order to ensure the reachability of the delegated addresses, even when the WTRUs are not directly attached. In this case, the tunnels needed to maintain the connectivity of the different addresses may be set up between the anchoring D-GWs and the WTRU itself, instead of between D-GWs, as for the network-based solution. The changes that may be required to support a client-based DMM solution are summarized herein.

The WTRU may have to be provided with a MIPv6 stack that allows the simultaneous use of multiple home addresses, each of them associated to a different home agent, for example, a D-GW. This may be a software change, as conceptually this may represent the case of multiple MIPv6 instances running on the same node. A new instance may be created every time the WTRU attaches to a new, not yet visited, D-GW. Instances may also be destroyed as soon as the home addresses are no longer being used by any running application.

The IPv6 source address selection mechanism at the WTRU may have to be modified so it encourage/force the use of the home address delegated by the serving D-GW for new communications. There may also be a monitoring function that is able to detect when an address is no longer needed, so the binding refresh of that (home) address is stopped.

Figure 8:
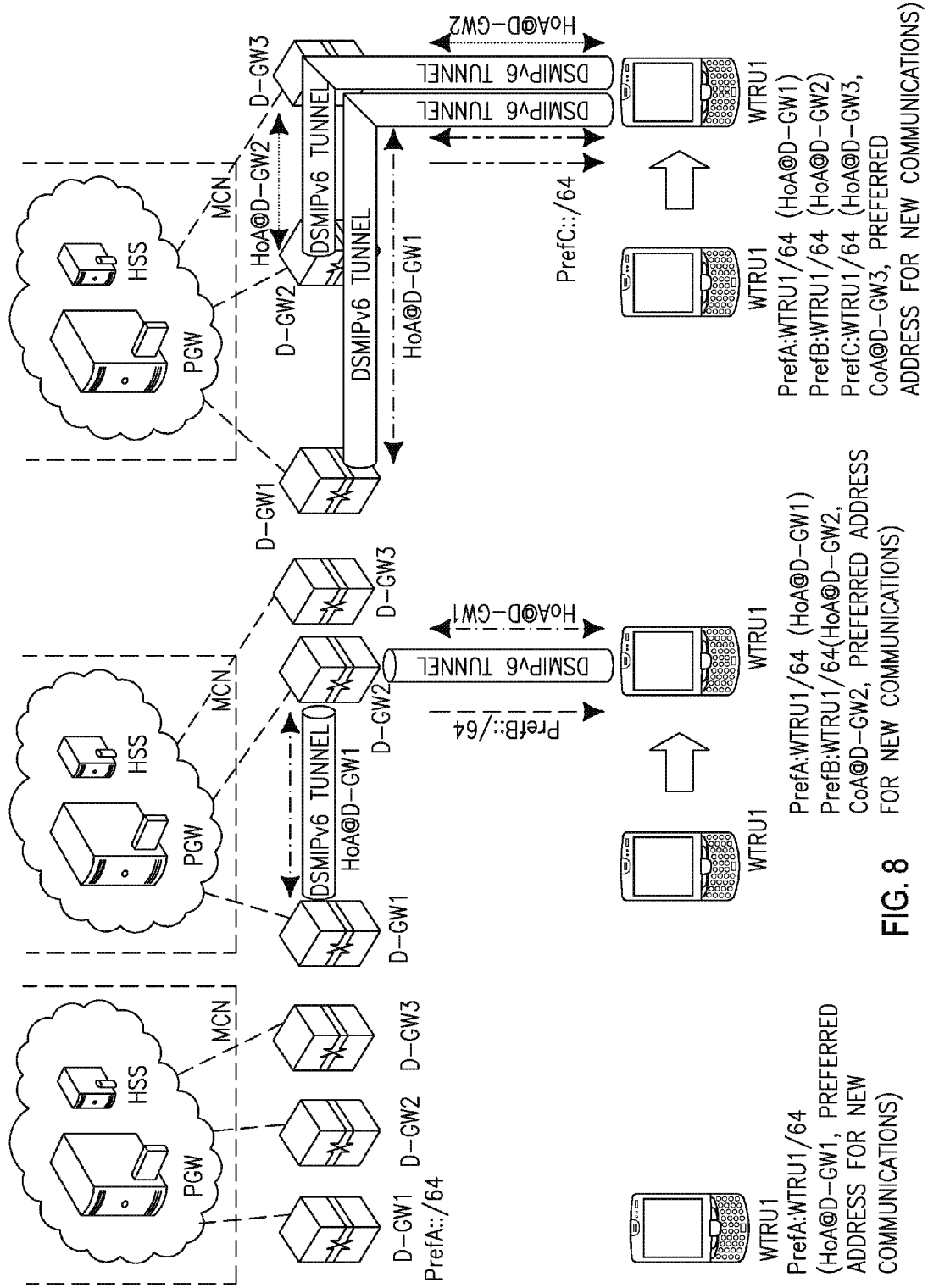
FIG. 8 shows an example of multiple flows anchored at different D-GWs in a client-based solution.

FIG. 8 shows an example of multiple flows anchored at different D-GWs in a client-base solution. The scenario consists of three D-GWs, (D-GW1, D-GW2, D-GW3) for simplicity of the explanation, but more D-GWs may be involved. A WTRU may initially attach to D-GW1, move to D-GW2, and then finally move to D-GW3, keeping the connectivity of each of the IPv6 addresses configured when visiting each of the D-GWs.

When WTRU1 attaches to D-GW1, it may configure an IPv6 address from a prefix locally anchored at D-GW1 (PrefA::/64). The configured address (PrefA::WTRU1/64) may be the home address delegated by D-GW1 (HoA@D-GW1). While connected to D-GW1, WTRU1 may use this address normally and traffic is locally handled by D-GW1, and no tunneling or any other special treatment may be required. If WTRU1 moves to D-GW2, it may configure a new address from a prefix locally anchored at D-GW2 (PrefB::/64). This address (PrefB::WTRU1/64) may play the role of HoA@D-G, which may be the preferred address for new communications, but it may also be used as a care of address (CoA@D-GW2) to keep the reachability of HoA@D-GW1. In order to do that, WTRU1 may exchange MIPv6 signaling (BU/BA) with D-GW1, setting up a tunnel between D-GW1 and WTRU1 which may be used for all the traffic of WTRU1 that uses HoA@D-GW1. If WTRU1 moves to D-GW3, the same process may take place. D-GW3 may advertise a locally anchored prefix (PrefC::/64) to WTRU1, which may configure a new IPv6 address (PrefC::WTRU1/64) as HoA@D-GW3, preferred address for new communications. This address may also be used as CoA@D-GW3 to keep the connectivity of HoA@D-GW1 and HoA@D-GW2, updating the tunnel to D-GW1 and setting up a new one with D-GW2.

Figure 9A:
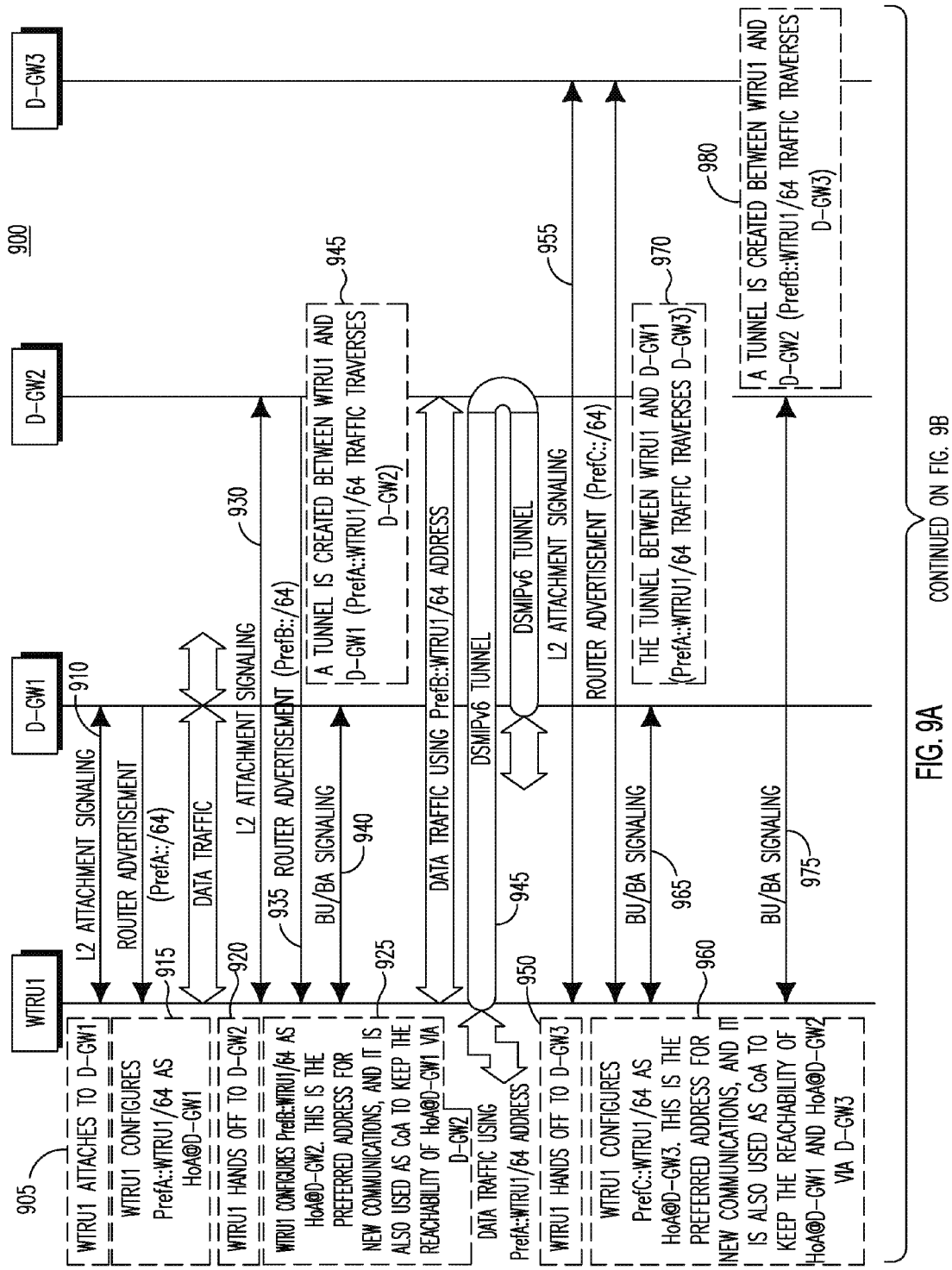
FIGS. 9A and 9B, taken together, show an example of a flow diagram of a client-based procedure for multiple flows anchored at different D-GWs.
Figure 9B:
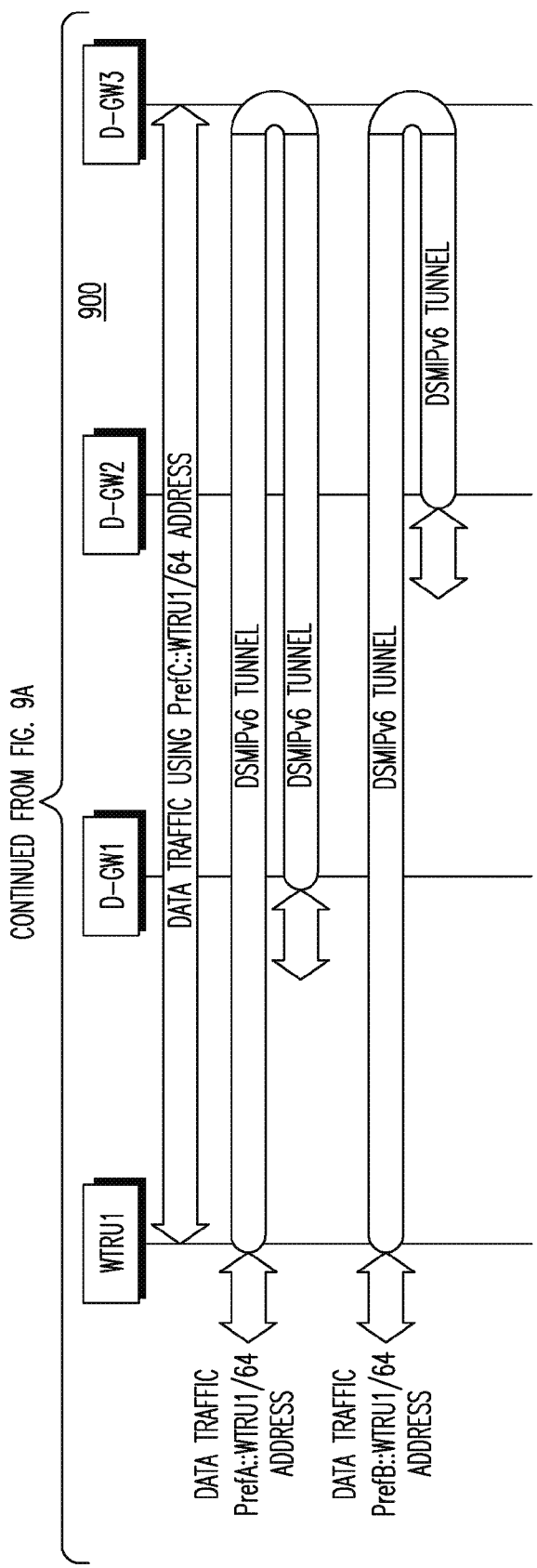

FIGS. 9A and 9B, taken together, show an example flow diagram of a procedure of the client-based solution for multiple flows anchored at different D-GWs, for which different actions and messages are exchanged when WTRU1 attaches to D-GW1, moves to D-GW2, and then to D-GW3, while maintaining on-going connections using the IPv6 addresses anchored at the three D-GWs.

As shown in FIG. 9A, WTRU1 may attach to D-GW1 (905). This event may be detected by D-GW1 via L2 attachment signaling (910). An IPv6 prefix may be selected by D-GW1 from a pool of locally anchored prefixes to be delegated to WTRU1 (PrefA::/64). WTRU1 may configure an address (PrefA::WTRU1/64) as HoA@D-GW1 (915). WTRU1 may perform a handover to D-GW2 (925). This event may be detected by D-GW2 via L2 attachment signaling (930). This may be an intra-operator handover.

An IPv6 prefix may be selected by D-GW2 from a pool of locally anchored prefixes to be delegated to WTRU1 (PrefB::/64) (935). WTRU1 may configure an address (PrefB::WTRU1/64) as HoA@D-GW2. This may be the address preferred for new communications. The address PrefB::WTRU1 may be used as a CoA (CoA@D-GW2) to maintain the reachability of HoA@D-GW1. Using that address as CoA, WTRU1 may transmit a binding update (BU) to D-GW1, binding HoA@D-GW1 to CoA@D-GW2 (940). D-GW1 may reply with a binding acknowledgement (BA) (940). A tunnel between WTRU1 and D-GW1 may be created (945). The routing may also be properly updated at D-GW1 to ensure the reachability of HoA@D-GW1. WTRU1 may perform a handover to D-GW3 (950). This event may be detected by D-GW3 via L2 attachment signaling (955).

An IPv6 prefix may be selected by D-GW3 from a pool of locally anchored prefixes to be delegated to WTRU1 (PrefC::/64) (960). WTRU1 may configure an address (PrefC::WTRU1/64) as HoA@D-GW3. This may be the address preferred for new communications. The address PrefC::WTRU1 may be used as a CoA (CoA@D-GW3) to maintain the reachability of HoA@D-GW1 and HoA@D-GW2. WTRU1 may transmit a first binding update (BU) to D-GW1, binding HoA@D-GW1 to CoA@D-GW3. D-GW1 may reply with a BA (965). The tunnel between WTRU1 and D-GW1 may be updated (970). The routing may also be properly updated at D-GW1 to ensure the reachability of HoA@D-GW1.

WTRU1 may transmit a second BU to D-GW2, binding HoA@D-GW2 to CoA@D-GW3, and D-GW2 may reply with a BA (975). A tunnel between WTRU1 and D-GW2 may be created (980). The routing may also be properly updated at D-GW2 to ensure the reachability of HoA@D-GW2.

A WTRU may roam between D-GWs that do not belong to the same operator, and therefore may end up having multiple simultaneous flows, anchored at different operators. The issue here is that dynamically setting up tunnels between different operators, between D-GWs belonging to different operators or between a D-GW and a WTRU attached to a D-GW of a different operator, may usually not be supported, and therefore a solution should be devised to ensure session continuity in this scenario, even at the cost of a sub-optimal routing.

The basic solution consists in using a centralized packet data network (PDN) gateway (PGW) as top-level anchor to guarantee session continuity when crossing operator borders. The necessary roaming agreements to support the PGW located at the home domain of the WTRU to set up tunnels to the visited D-GWs, for the network-based solution, or to the WTRU attached to a visited D-GW, for the client-based solution may exist. This is a common assumption.

A network-based solution may be based on using an anchor point on the core network of the WTRU's operator, so it may be used as forwarding entity between different domains. This introduces suboptimal routing, as paths are longer and traverse the mobile operator's core, which are two of the issues DMM tries to mitigate, but may be considered as a trade-off to support inter-operator roaming.

Figure 10B:
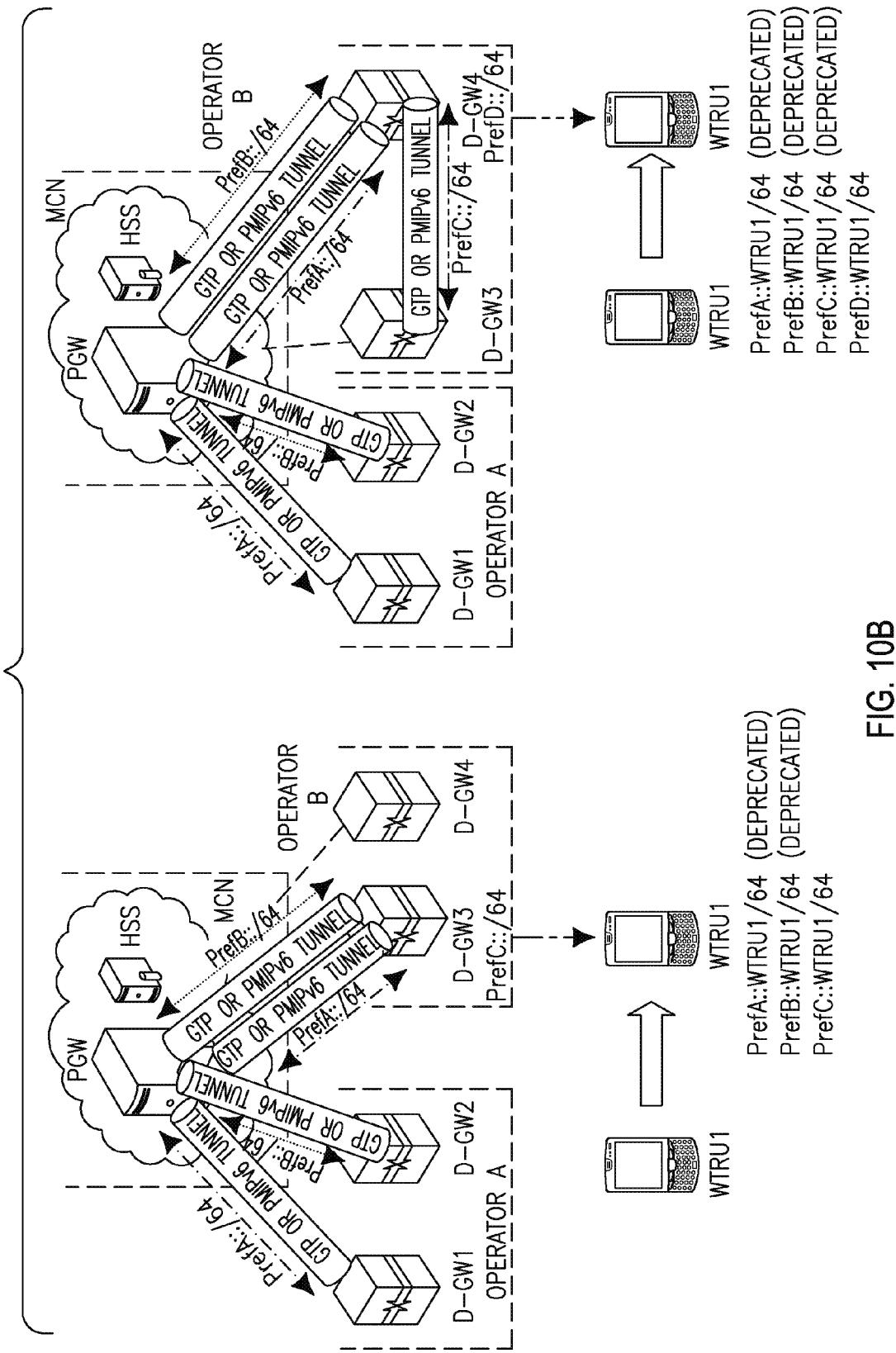
Figure 11A:
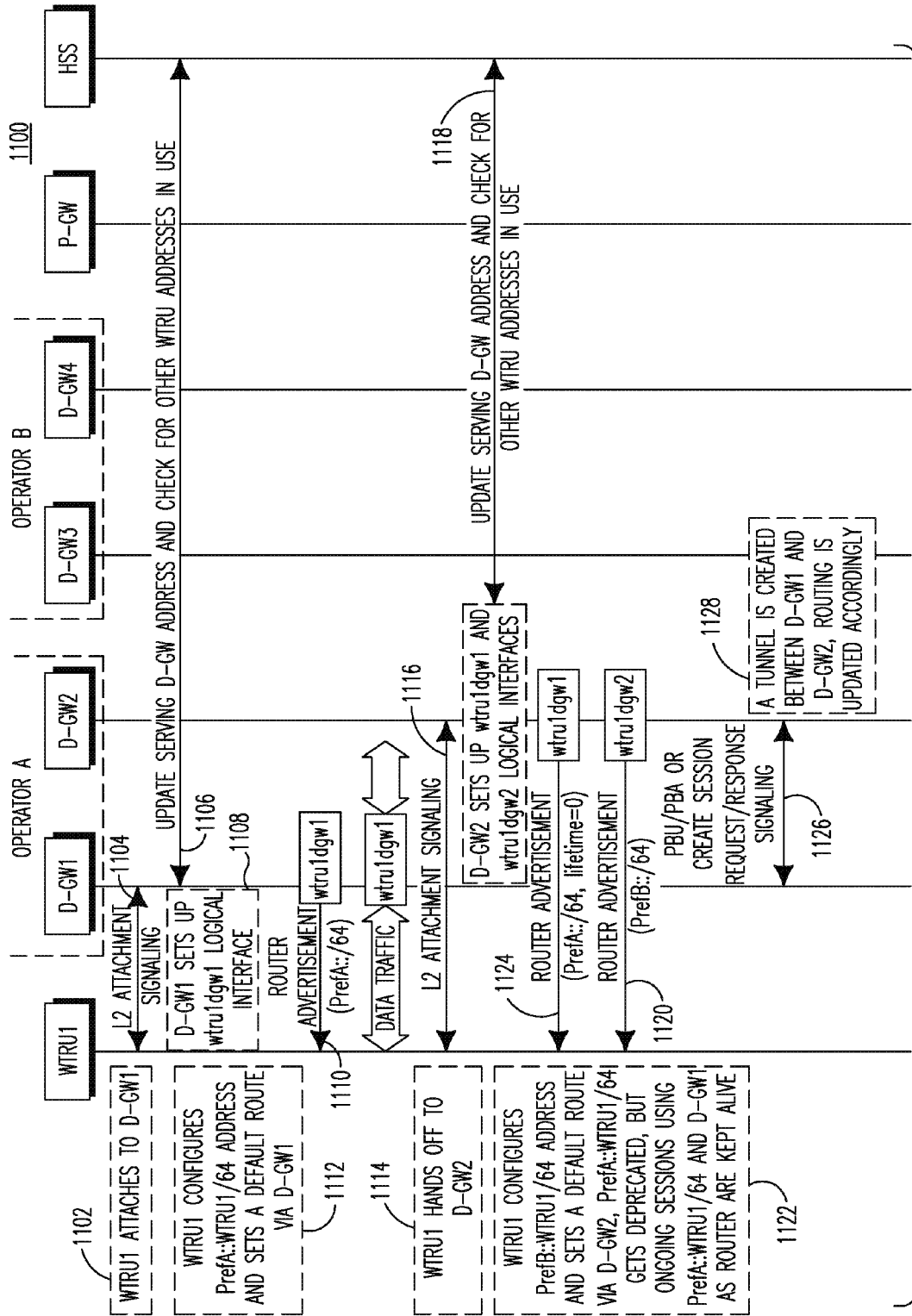
Figure 11C:
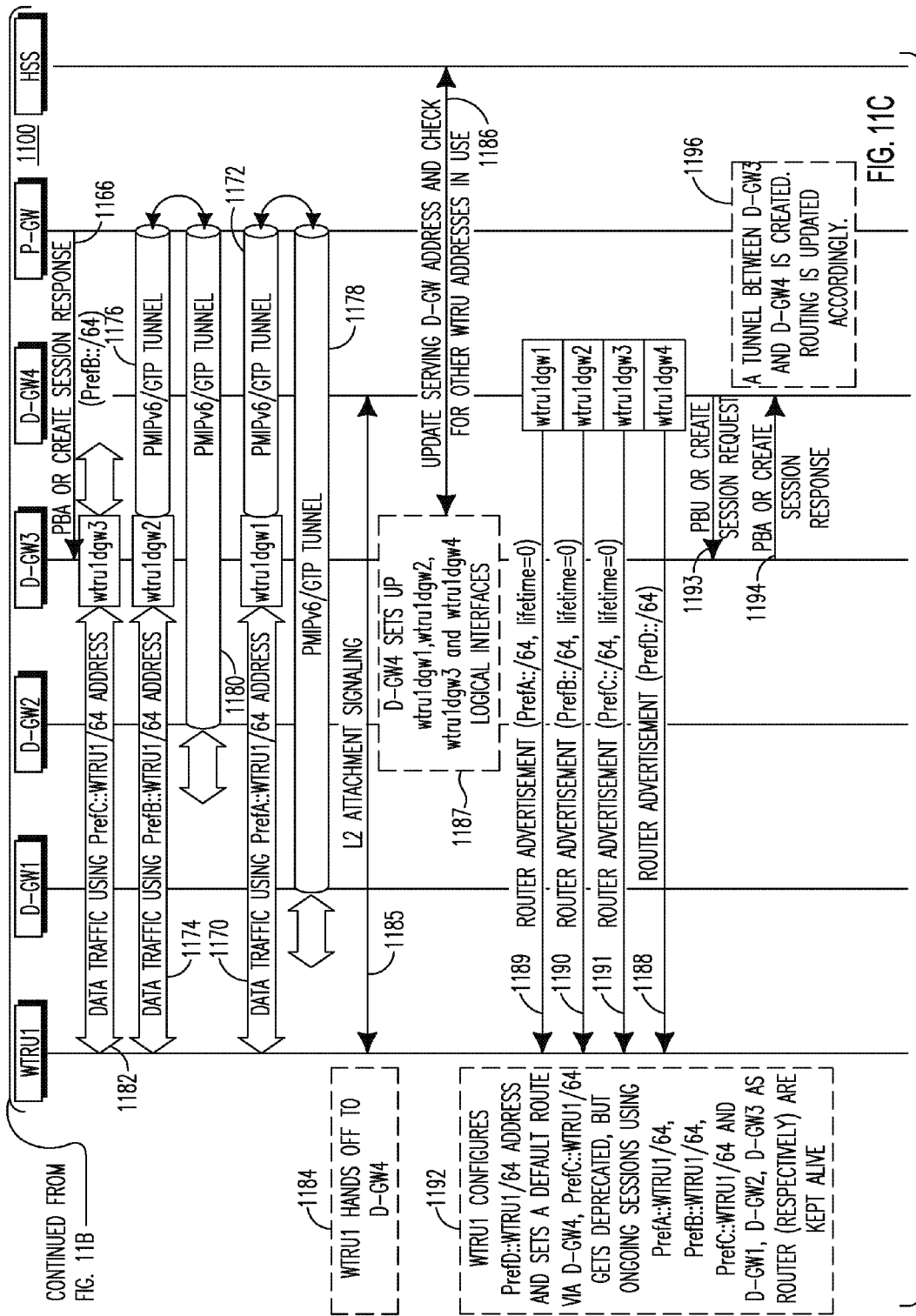
Figure 11D:
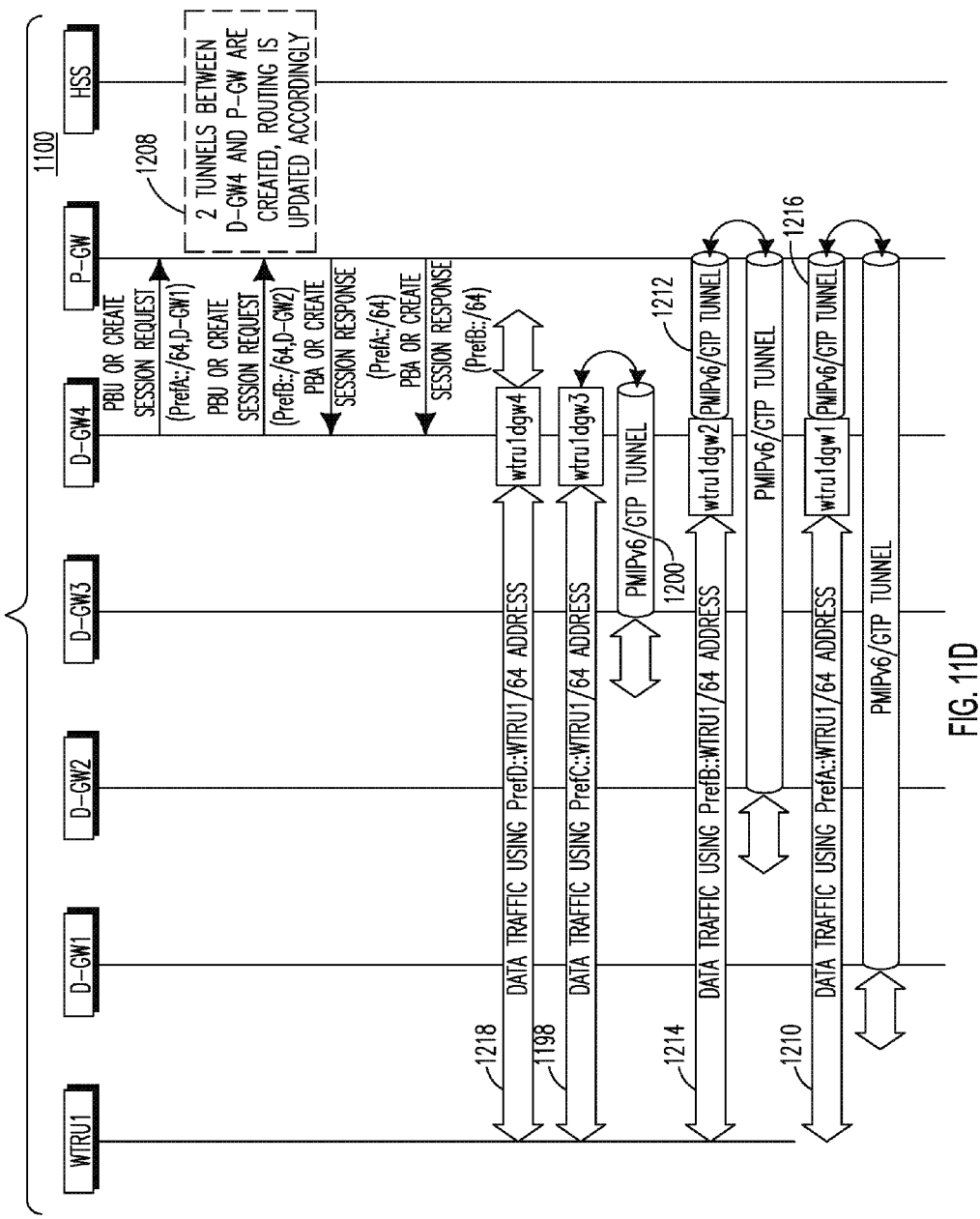

FIGS. 10A and 10B, taken together, show an example of multiple operators anchoring in a network-based solution. WTRU1 may attach to D-GW1, belonging to Operator A, and may configure an IPv6 address from a prefix anchored at D-GW1 (PrefA::/64). This may be the default operation of our DMM solution. If WTRU1 moves to D-GW2, which is also managed by Operator A, it may obtain a new address (PrefB::WTRU1/64) from the new serving D-GW, which may also establish a tunnel with the former one, D-GW1, to maintain the reachability of the address PrefA::WTRU1/64 anchored at D-GW1. Since both D-GW1 and D-GW2 belong to the same operator, this just follows a regular operation of the solution. The involved D-GWs may be aware of where the prefixes currently used by WTRU1 are anchored by consulting the HSS.

If WTRU1 moves to D-GW3, which is managed by Operator B, tunnels may need to be established via the PGW at the WTRU1's operators core, assuming that no direct tunneling is possible between D-GWs belonging to different operators. In this case, D-GW3 may establish two tunnels with PGW to transmit/receive traffic using PrefA::/64 and PrefB::/64. From the point of view of D-GW3, the operation may be just as if the PGW was the D-GW anchoring these two prefixes. Analogously, PGW may establish two tunnels, one with D-GW1 and one with D-GW2, from the point of view of D-GW1 and D-GW2, PGW is the current serving D-GW of WTRU1. Regarding the signaling, it may almost be the same of the intra-operator scenario, though in this case the PBU/PBA or Create Session Request/Response for GTP sequence may perform twice, one between D-GW3 and PGW, and another one between PGW and D-GW1/2.

Finally, in order to also consider what happens if the WTRU performs a new handover within the same domain, WTRU1 may move to D-GW4, managed by Operator B. In this case, in addition to the IPv6 address configuration using a prefix anchored at the serving D-GW (PrefD::/64), three tunnels may need to be set up. First, one between D-GW3 and D-GW4, intra operator handover, to maintain the reachability of PrefC::/64. Additionally, two tunnels may need to be updated with PGW, to maintain the reachability of PrefA::/64 and PrefB::/64. The tunnels between PGW and D-GW1 and D-GW2 may not need to be modified.

FIGS. 11A-11D show an example of a flow diagram of a procedure 1100 for the network-based solution including the different actions and messages exchanged when WTRU1 attaches to D-GW1, moves to D-GW2, intra-domain handover, then to D-GW3, inter-domain handover, and finally to D-GW4, while maintaining on-going connections using the IPv6 addresses anchored at the four D-GWs. Some interactions to the HSS (/authorization, authentication and accounting (AAA)) may involve a proxy AAA server on the visited domain.

WTRU1 may attach to D-GW1 (1102). This event may be detected by D-GW1 (1104). An IPv6 prefix may be selected by D-GW1 from a pool of locally anchored prefixes to be delegated to WTRU1 (PrefA::/64). D-GW1 may contact the HSS to perform a location update procedure, including the selected prefix, and subscriber data retrieval from the HSS (1106). D-GW1 may obtain information about all the active IPv6 prefixes, anchored at other D-GWs, that WTRU1 may be using, as well as the information required to be able to guarantee the reachability of these prefixes at the current location. This information may include, for each anchoring D-GW: the MAC and link-local IPv6 addresses exposed on the logical ingress interface of the D-GW, and IPv6 address, and/or additional info needed to setup a GTP tunnel, if the GTP solution is used, of the D-GW to setup the bidirectional tunnel. In this case, there may be no other active prefix being used by the D-GW, for example, initial attachment.

D-GW1 may set up a logical interface aimed at interfacing with WTRU1, called wtru1dgw1 (1108). Traffic using the address PrefA::WTRU1 may be received at the interface wtru1dgw1 and directly forwarded by D-GW1 towards its destination (1110). The logical interface wtru1dgw1 may used by D-GW1 to advertise the locally anchored prefix (PrefA::/64) to WTRU1 (1110). Using this prefix, WTRU1 may configure an IPv6 address (PrefA::WTRU1/64) that may be used in new communications, which may be anchored at D-GW1 (1112). WTRU1 may perform a handover to D-GW2 (1114). This event may be detected by D-GW2 (1116). This may be an intra-operator handover.

An IPv6 prefix may be selected by D-GW2 from a pool of locally anchored prefixes to be delegated to WTRU1 (PrefB::/64). D-GW2 may contact the HSS to perform a location update procedure, including the selected prefix, and subscriber data retrieval from the HSS. D-GW2 may obtain information about all the active IPv6 prefixes, anchored at other D-GWs, that the WTRU may be using, as well as the information required to be able to guarantee the reachability of these prefixes at the current location. In this case, WTRU1 may be using PrefA::/64 (anchored at D-GW1).

D-GW2 may set up two logical interfaces aimed at interfacing with WTRU1, called wtru1dgw2 and wtru1dgw1 (1116). The first one, wtru1dgw2, may portray the D-GW2 as anchoring D-GW and may therefore be used for communications using PrefB::/64. The second one, wtru1dgw1, may be used to logically emulate D-GW1, even though WTRU1 may be no longer physically attached to D-GW1. The information needed to configure wtru1dgw1 so it resembles exactly the interface at D-GW1 may be obtained from the HSS (1118).

The logical interface wtru1dgw2 may be used by D-GW2 to advertise the locally anchored prefix (PrefB::/64) to WTRU1 (1120). Using this prefix, WTRU1 may configure an IPv6 address (PrefB::WTRU1/64) that may be used in new communications, which may be anchored at D-GW2 (1122). Similarly, the logical interface wtru1dgw1 may be used by D-GW2 to advertise to WTRU1 the prefix anchored at D-GW1 (PrefA::/64), but with a zero lifetime, to deprecate the address previously configured by WTRU1 PrefA::WTRU1/64) so it may not be used in new communications (1122, 1124).

D-GW2, using the information obtained from the HSS, may transmit a PBU or a create session request if the GTP solution is used, to signal to D-GW1 that WTRU1 has moved and that a bi-directional tunnel has to be setup so the reachability of the prefix anchored at D-GW1 used by WTRU1 may be maintained (1126). A PBA/create session response may be transmitted in response (1126). A tunnel may be created, and the routing may be updated accordingly at both ends of the tunnel (1128). Thus, D-GW2 may insert a source-based route, so all traffic with source address PrefA::WTRU1/64 (1130) may be transmitted via the tunnel 1132, and that D-GW1 may insert a route pointing towards the tunnel to reach PrefA::/64. This tunnel may be created on a per-WTRU basis, so different traffic management policies may be applied to different traffic. Alternatively, tunnels between D-GWs may be re-used.

Traffic using the address PrefB::WTR1 may be received at the interface wtru1dgw2 and directly forwarded by D-GW2 towards its destination (1134). Traffic using the address PrefA::WTRU1 may be received at the interface wtru1dgw1 (1130) and forwarded via the tunnel 1132 between D-GW1 and D-GW2.

WTRU1 may perform a handover to D-GW3 (1136). This event may be detected by D-GW3 (1138). This may be an inter-operator handover. An IPv6 prefix may be selected by D-GW3 from a pool of locally anchored prefixes to be delegated to WTRU1 (PrefC::/64). D-GW3 may contact the HSS to perform a location update procedure, including the selected prefix, and subscriber data retrieval from the HSS. D-GW3 may obtain information about all the active IPv6 prefixes, anchored at other D-GWs, that the WTRU may be using, as well as the information required to be able to guarantee the reachability of these prefixes at the current location (1140). In this case, WTRU1 may be using both PrefA::/64, anchored at D-GW1, and PrefB::/64, anchored at D-GW2, but since D-GW1 and D-GW2 belong to a different domain, D-GW3 may have to set up the tunnels via the PGW located at the WTRU1's domain.

D-GW3 may set up three logical interfaces aimed at interfacing with WTRU1, called wtru1dgw3, wtru1dgw1 and wtru1dgw2 (1142). The first one, wtru1dgw3, may portray the D-GW3 as anchoring D-GW and is therefore used for communications using PrefC::/64 (1144). The second one, wtru1dgw1, may be used to logically emulate D-GW1, even though WTRU1 may no longer be physically attached to D-GW1 (1146). Analogously, the third one, wtru1dgw2, may be used to logically emulate D-GW2 (1150). The information needed to configure wtru1dgw1 and wtru1dgw2 so they resemble exactly the interfaces at D-GW1 and D-GW2 may be obtained from the HSS.

The logical interface wtru1dgw3 may be used by D-GW3 to advertise the locally anchored prefix (PrefC::/64) to WTRU1 (1144). Using this prefix, WTRU1 may configure an IPv6 address (PrefC::WTRU1/64) that may be used in new communications, which may be anchored at D-GW3 (1150). Similarly, the logical interface wtru1dgw1 may be used by D-GW3 to advertise to WTRU1 the prefix anchored at D-GW1 (PrefA::/64), but with a zero lifetime, to deprecate the address previously configured by WTRU1 PrefA::WTRU1/64, so it is not used in new communications (1146, 1150). The logical interface wtru1dgw2 may be used by D-GW3 to advertise to WTRU1 the prefix anchored at D-GW2 (PrefB::/64), but with a zero lifetime, to deprecate the address previously configured by WTRU1 (PrefB::WTRU1/64) so it is not used in new communications (1148, 1150).

D-GW3, using the information obtained from the HSS, may transmit a PBU or a create session request if the GTP solution may be used, to signal to the PGW that WTRU1 has moved and that bi-directional tunnels have to be setup so the reachability of the prefixes anchored at D-GW1 and D-GW2 used by WTRU1 may be maintained (1152, 1154). Based on the interactions with the HSS, D-GW3 may know that WTRU1 has active prefixes anchored at D-GWs belonging to a different operator. When the PGW receives a PBU/create session request from D-GW3 (1152, 1154), the PGW may transmit a new PBU/create session request to the correct anchoring D-GW (1156, 1158). D-GW3 may include in the initial signaling to the PGW the identity and addressing information of D-GW1 and D-GW2, so that the PGW may generate the correct signaling. Once D-GW1 and D-GW2 reply to the PGW with a PBA/create session response (1160, 1162), two tunnels may be established between the PGW and D-GW1/D-GW2 (1162). The PGW may then transmit back PBA/create session response signaling to D-GW3 (1164, 1166), which may also trigger the setup of two tunnels between PGW and D-GW3, one per each anchoring D-GW (1168).

The routing may be updated accordingly at D-GW1, D-GW2, D-GW3 and the PGW. D-GW3 may insert a source-based route, so that all traffic with source address PrefA::WTRU1/64 (1170) may be transmitted via the tunnel 1172 with the PGW, and another source-based route, so that all traffic with source address PrefB::WTRU1/64 (1174) may be transmitted via the other tunnel (1176) with the PGW. D-GW1 may update the routing so that traffic to PrefA::/64 (1170) may be transmitted via the tunnel 1178 with the PGW. Analogously, D-GW2 may update the routing so traffic to PrefB::/64 (1174) may be transmitted via the tunnel 1180 with the PGW. The PGW may add the needed routes. For example, a source-based route so that all traffic with source address PrefA::WTRU1/64 (1170) may be transmitted via the tunnel 1178 with D-GW1, a source-based route so that all traffic with source address PrefB::WTRU1/64 (1174) may be transmitted via the tunnel 1180 with D-GW2, a route for traffic to PrefA::/64 (1170) via the tunnel 1172 with D-GW3, and a route for traffic to PrefB::/64 (1170) via the other tunnel 1176 with D-GW3.

Traffic using the address PrefC::WTRU1 (1182) may be received at the interface wtru1dgw3 and directly forwarded by D-GW3 towards its destination. WTRU1 may perform a handover to D-GW4 (1184). This event may be detected by D-GW4 (1185). This may be an intra-operator handover.

An IPv6 prefix may be selected by D-GW4 from a pool of locally anchored prefixes to be delegated to WTRU1 (PrefD::/64). D-GW4 may contact the HSS to perform a location update procedure, including the selected prefix, and subscriber data retrieval from the HSS. D-GW4 may obtain information about all the active IPv6 prefixes, anchored at other D-GWs, that WTRU1 may be using, as well as the information required to be able to guarantee the reachability of these prefixes at the current location. In this case, WTRU1 may be using PrefA::/64, anchored at D-GW1, PrefB::/64, anchored at D-GW2, and PrefC::/64, anchored at D-GW3. D-GW1 and D-GW2 may belong to a different domain, and D-GW3 may belong to the same domain.

D-GW4 may set up four logical interfaces aimed at interfacing with WTRU1, called wtru1dgw4, wtru1dgw1, wtru1dgw2, and wtru1dgw3 (1187). The first one, wtru1dgw4, may portray the D-GW4 as anchoring D-GW and may therefore be used for communications using PrefD::/64 (1188). The second one, wtru1dgw1, may be used to logically emulate D-GW1, even though WTRU1 is no longer physically attached to D-GW1 (1189). The third one, wtru1dgw2, may be used to logically emulate D-GW2 (1190). The last one, wtru1dgw3, may be used to logically emulate D-GW3 (1191). The information needed to configure wtru1dgw1, wtru1dgw2 and wtru1dgw3 so they resemble exactly the interfaces at D-GW1, D-GW2 and D-GW3 may be obtained from the HSS.

The logical interface wtru1dgw4 may used by D-GW4 to advertise the locally anchored prefix (PrefD::/64) to WTRU1. Using this prefix, WTRU1 may configure an IPv6 address (PrefD::WTRU1/64) that may be used in new communications, which may be anchored at D-GW4 (1192). Similarly, the logical interface wtru1dgw1 may be used by D-GW4 to advertise to WTRU1 the prefix anchored at D-GW1 (PrefA::/64), but with a zero lifetime, to deprecate the address previously configured by WTRU1 PrefA::WTRE1/64, so that it is not used in new communications. The logical interface wtru1dgw2 may be used by D-GW4 to advertise to WTRU1 the prefix anchored at D-GW2 (PrefB::/64), but with a zero lifetime, to deprecate the address previously configured by WTRU1 PrefB::WTRU1/64, so that it is not used in new communications. The logical interface wtru1dgw3 may be used by D-GW4 to advertise to WTRU1 the prefix anchored at D-GW3 (PrefC::/64), but with a zero lifetime, to deprecate the address previously configured by WTRU1 PrefC::WTRU1/64, so it is not used in new communications.

D-GW4, using the information obtained from the HSS, may transmit a PBU or a create session request if the GTP solution may be used, to signal to D-GW3 that WTRU1 has moved and that a bi-directional tunnel has to be setup so the reachability of the prefix anchored at D-GW3 used by WTRU1 may be maintained (1193). A PBA/create session response may be transmitted in response (1194). A tunnel may be created, and the routing may be updated accordingly at both ends of the tunnel (1196). Thus, D-GW4 may insert a source-based route, so that all traffic with source address PrefC::WTRU1/64 (1198) may be transmitted via the tunnel 1200 with D-GW3, and that D-GW3 may insert a route pointing towards the tunnel 1200 to reach PrefC::/64 (1198). The tunnel 1200 may be created on a per-WTRU basis, so that different traffic management policies may be applied to different traffic. Alternatively, tunnels between D-GWs may be re-used.

Analogously, D-GW4 may transmit a PBU or a create session request if the GTP solution may be used, to signal to PGW that WTRU1 has moved and that bi-directional tunnels have to be updated so the reachability of the prefixes anchored at D-GW1 and D-GW2 used by WTRU1 may be maintained. Based on the interactions with the HSS, D-GW4 may know that WTRU1 has active prefixes anchored at D-GWs belonging to a different operator. Since the tunnels with D-GW1 and D-GW2 are already created, PGW may transmit back PBA/create session response signaling to D-GW4, which may trigger the update of the two tunnels between PGW and D-GW4, one per each anchoring D-GW (1208).

The routing may be updated accordingly at D-GW3, D-GW4 and PGW. D-GW4 may insert a source-based route, so all traffic with source address PrefA::WTRU1/64 (1210) may be transmitted via the tunnel 1212 with the PGW, a source-based route, so that all traffic with source address PrefB::WTRU1/64 (1214) may be transmitted via the other tunnel 1216 with the PGW. Analogously, D-GW4 may also insert a source-based route so that all traffic with source address PrefC::WTRU1/64 (1196) may be transmitted via the tunnel 1198 with D-GW3, intra-operator handover. The PGW may update the involved routes, traffic to PrefA::/64 and PrefB::/64 (1210, 1214) may be routed via the tunnels 1212 and 1216 with D-GW4. Traffic using the address PrefD:: WTRU1 (1218) may be received at the interface wtru1dgw4 and directly forwarded by D-GW4 towards its destination.

Since operator policies may not allow tunnels to traverse different operators, there may be no change required to support multiple operators, and thus this may be one advantage of the client-based solution. If the operator policies/firewalls do not allow such tunnels to be established, then the proposed solution may be similar to the network-based one.

Figure 12A:
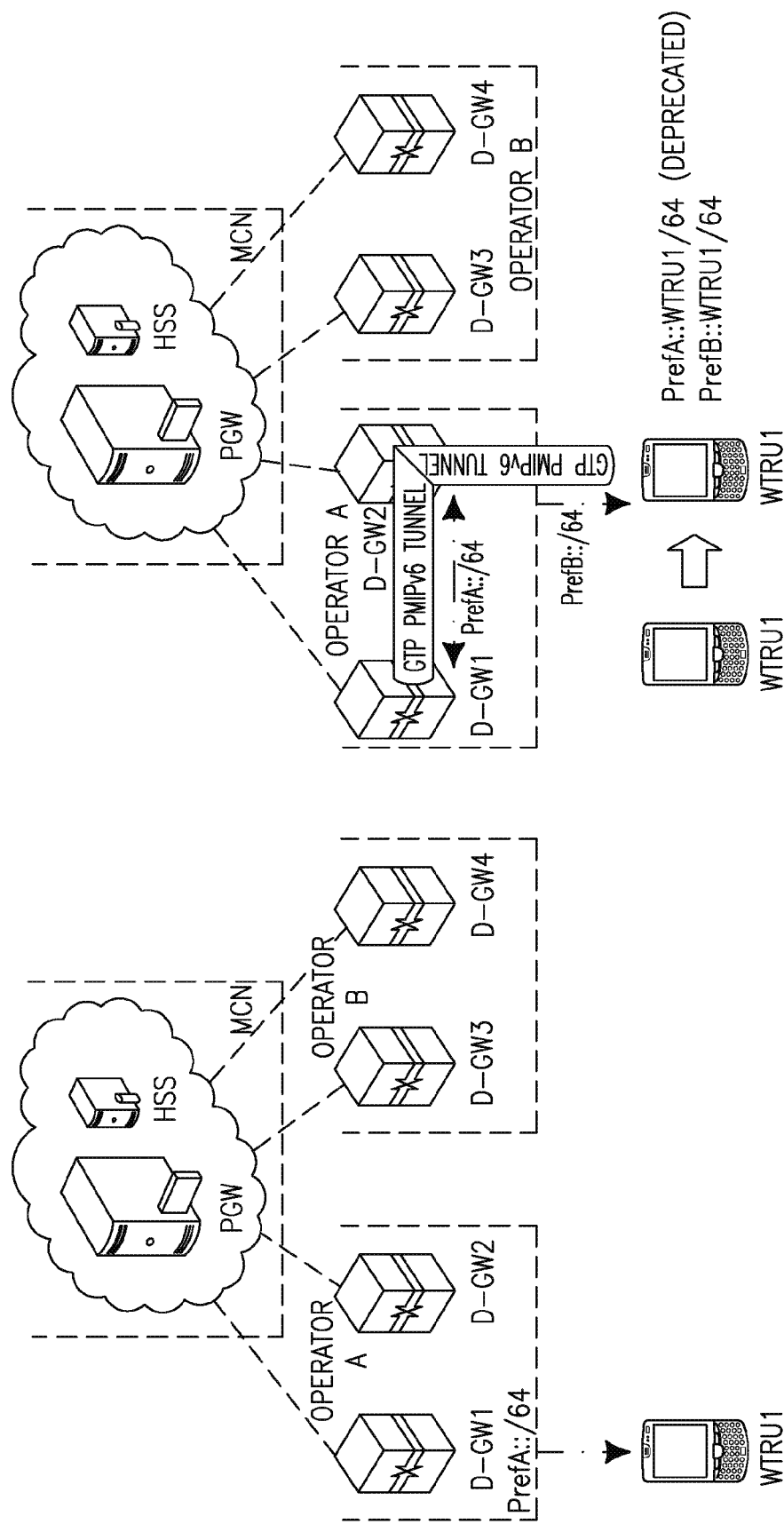
FIGS. 12A and 12B show an example of multiple operators anchoring in a client-based solution.
Figure 12B:
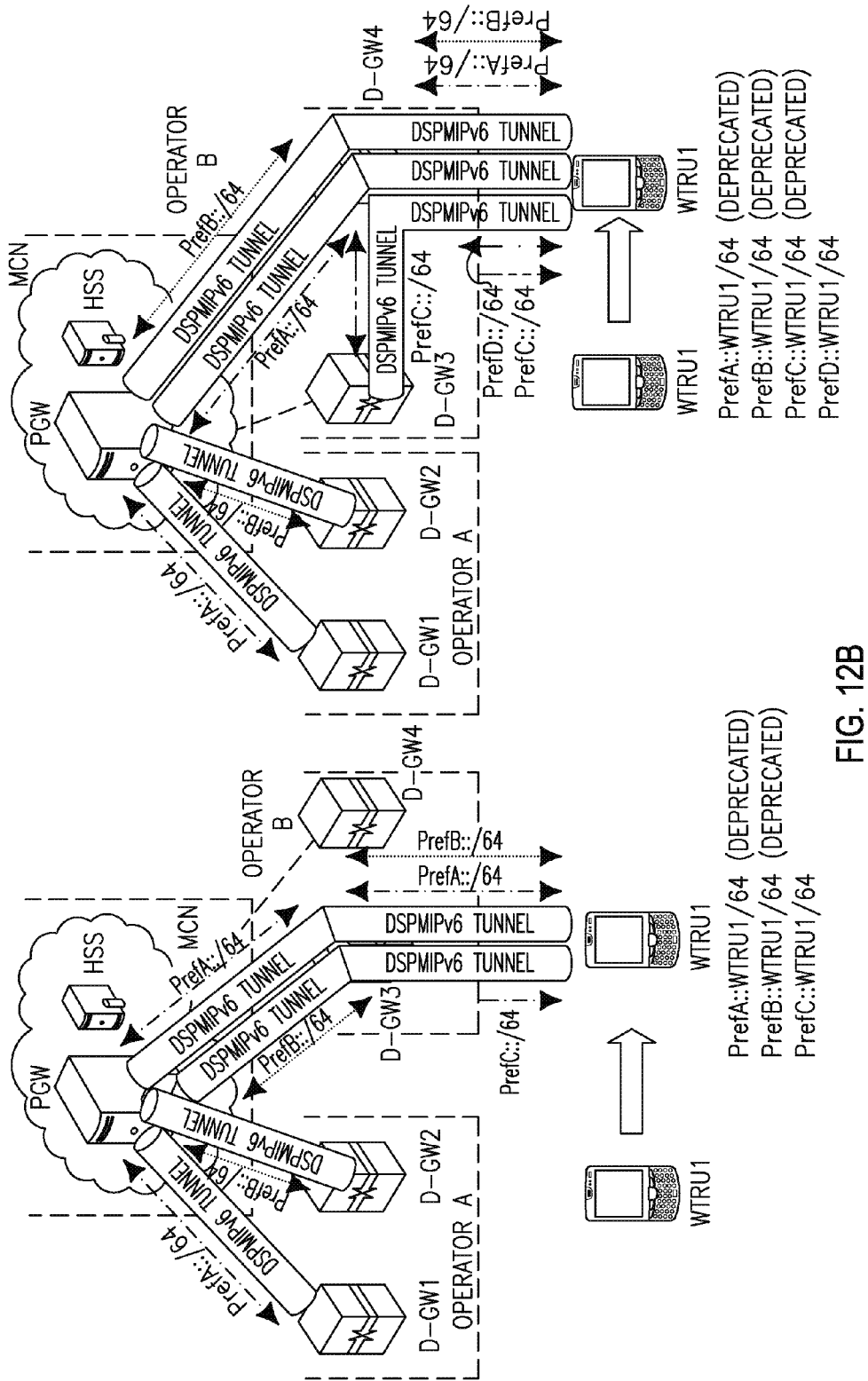

FIGS. 12A and 12B show an example of multiple operators anchoring in a client-based solution. Basically, the same concept of using the PGW as anchoring & forwarding entity when crossing operator boundaries may be used. To enable tunnels to traverse different operators, the idea is also to use the PGW as tunnel end-point, assuming that tunnels to the PGW are permitted by the roaming agreements. In FIG. 12, when WTRU1 moves from D-GW2 to D-GW3, there are two tunnels that may need to be set up to maintain the reachability of PrefA::/64 and PrefB::/64. These two tunnels may be established with the PGW, which may also set up two tunnels with D-GW1 and D-GW2. From the point of view of WTRU1, the PGW may now anchor both PrefA::/64 and PrefB::/64. Frp, the point of view of D-GW1 and D-GW2, PGW may be the serving D-GW of WTRU1. BU/BA signaling may be used to setup the tunnels.

Figure 13A:
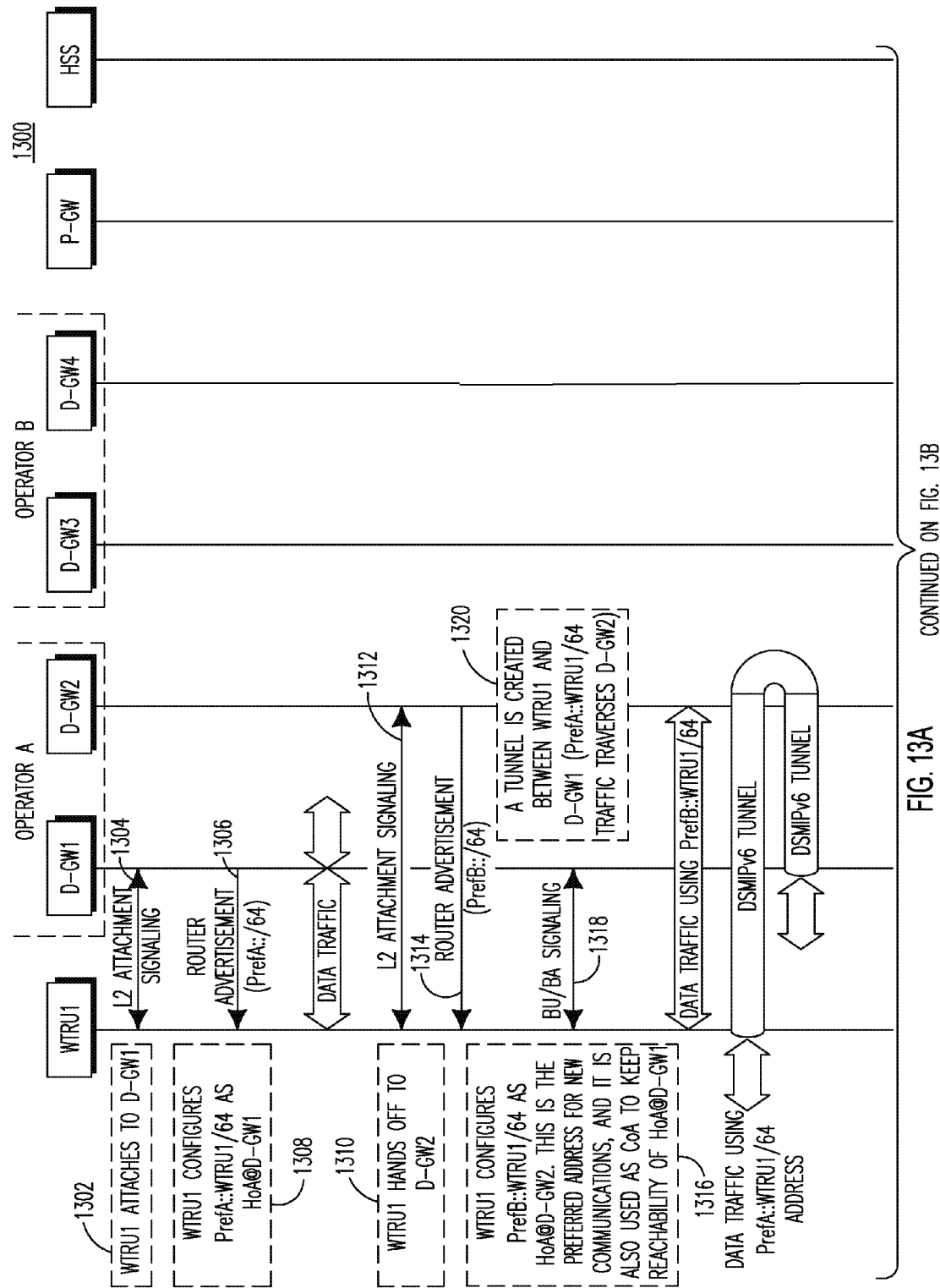
Figure 13C:
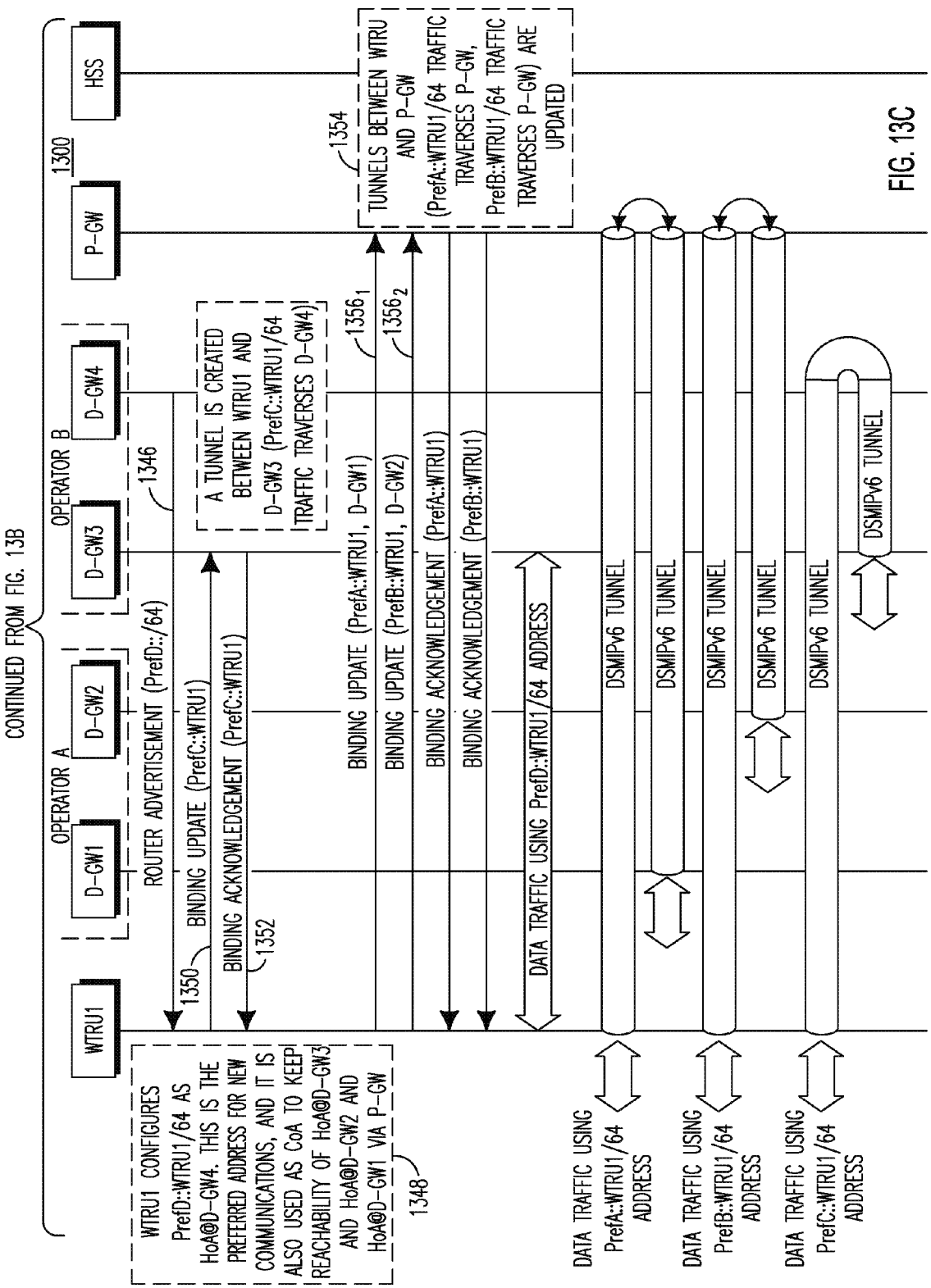

FIGS. 13A-13C, taken together, show an example flow diagram of a client-based procedure 1300, where WTRU1 attaches to D-GW1, moves to D-GW2, performs an intra-domain handover, then moves to D-GW3, performs an inter-domain handover, and finally to moves to D-GW4, while maintaining on-going connections using the IPv6 addresses anchored at the four D-GWs. Some interactions to the HSS(/AAA) may involve a proxy AAA server on the visited domain.

WTRU1 may attach to D-GW1 (1302). This event may be detected by D-GW1 via L1 attachment signaling (1304). An IPv6 prefix may be selected by D-GW1 from the pool of locally anchored prefixes to be delegated to WTRU1 (PrefA::/64) (1306). WTRU1 may configure an address (PrefA::WTRU1/64) as HoA@D-GW1 (1308). WTRU1 may perform a handover to D-GW2 (1310). This event may be detected by D-GW2 via L2 attachment signaling (1312). This may be an intra-operator handover.

An IPv6 prefix may be selected by D-GW2 from a pool of locally anchored prefixes to be delegated to WTRU1 (PrefB::/64) (1314). WTRU1 may configure an address (PrefB::WTRU1/64) as HoA@D-GW2 (1316). This may be the address preferred for new communications. The address PrefB::WTRU1 may be used as a CoA (CoA@D-GW2) to maintain the reachability of HoA@D-GW1 (1316). Using that address as a CoA, WTRU1 may transmit a BU to D-GW1, binding HoA@D-GW1 to CoA@D-GW2, and D-GW1 may reply with a BA (1318). A tunnel between WTRU1 and D-GW1 may be created (1320). The routing may also be properly updated at D-GW1 to ensure the reachability of HoA@D-GW1.

WTRU1 may perform a handover to D-GW3 (1322). This event may detected by D-GW3 via L2 attachment signaling (1324). This may an inter-operator handover. An IPv6 prefix from the pool of locally anchored prefixes may be selected by D-GW3 to be delegated to WTRU1 (PrefC::/64) (1326). WTRU1 may configure an address (PrefC::WTRU1/64) as HoA@D-GW3 (1328). This may the address preferred for new communications.

The address PrefC::WTRU1 may be used as a CoA (CoA@D-GW3) to maintain the reachability of HoA@D-GW1 and HoA@D-GW2 (1328). Since it is an inter-domain handover and WTRU1 may not be allowed to transmit/receive BU/BA signaling and/or to establish tunnels with nodes located at another domain, WTRU1 may transmit two BU messages 1330₁ and 1330₂, one per active HoA used by WTRU1, to the PGW of its home domain, using CoA@D-GW3 as CoA. Each of these BU messages 1330 may contain not only the CoA and HoA, but also the D-GW anchoring the HoA. It may be an extended BU message. This information may be used by the PGW to transmit another BU to the anchoring D-GW. By doing this, two chained tunnels may be created per active HoA: one between the WTRU and the PGW (1332), and another one between the PGW and the anchoring D-GW (1334). Following the example of FIG. 13, four tunnels may be established: two between WTRU1 and PGW (1336₁, 1336₂), one between PGW and D-GW1 (1338) and one between PGW and D-GW2 (1340). These tunnels may be used to maintain the reachability of PrefA::WTRU1 and PrefB::WTRU1. The routing may be updated accordingly at D-GW1, D-GW2 and PGW.

The P-GW may maintain information in its routing table and binding cache required to be able to route traffic addressed to and from the prefixes anchored at D-GW1 and D-GW2. For example, traffic addressed to PrefA::WRTU1 may be anchored at D-GW1 and may be therefore received by D-GW1, which may encapsulate it and send it to the P-GW. The P-GW may remove the tunnel header, check its routing table and/or binding cache, and forward the packets via the tunnel with WRTU1, which is attached to D-GW3. In the reverse direction, traffic sent by WRTU1 using as source address PrefA::WRTU1 may be encapsulated by D-GW3 to P-GW, which may remove the tunnel header and check its routing table and/or binding cache to learn that traffic has to be encapsulated to D-GW1. For example, the P-GW may receive traffic from one tunnel interface, remove the outer header, look into its routing table/binding cache, and route via a new tunnel, adding a new header. This may also require source-based routing at the PGW, as for example, traffic from PrefA::WTRU1 may have to be forwarded via the tunnel with D-GW1, and traffic from PrefB::WTRU1 may have to be forwarded via the tunnel with D-GW2.

WTRU1 may perform a handover to D-GW4 (1342). This event may be detected by D-GW4 via L2 attachment signaling (1344). This may be an intra-operator handover. An IPv6 prefix may be selected by D-GW4 from a pool of locally anchored prefixes to be delegated to WTRU1 (PrefD::/64) (1346). WTRU1 may configure an address (PrefD::WTRU1/64) as HoA@D-GW4 (1348). This may be the address preferred for new communications.

The address PrefD::WTRU1 may be used as a CoA (CoA@D-GW4) to keep the reachability of HoA@D-GW1, HoA@D-GW2 and HoA@D-GW3 (1348). Using that address as CoA@D-GW4, WTRU1 may transmit a BU to D-GW3 (1350), binding HoA@D-GW3 to CoA@D-GW4. D-GW3 may reply with a BA (1352). A tunnel between WTRU1 and D-GW3 may be created (1354). WTRU1 may also transmit two BU messages (1356₁ and 1356₂), one per active HoA anchored at Operator A, to the PGW in order to update the tunnels created, using CoA@D-GW4 as CoA. Only the tunnels between the PGW and WTRU1 may need to be updated (1358), as for the ones between PGW and D-GW1/2, no end-point changes. The routing at the PGW may have to be updated accordingly.

The solutions described may be applied to a virtual operator solution. For example, a common practice with IEEE 802.11 may be to setup virtual access points over a single physical access point (AP), exposing different service set identifies (SSIDs), and then mapping the traffic to different virtual local area networks (VLANs) or virtual private networks (VPNs) towards the operator's network core. Logical interfaces may be created on top of these virtual APs, therefore not impacting on the solutions previously defined.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, MN, terminal, base station, Node-B, eNB, HNB, HeNB, AP, RNC, wireless router or any host computer.

What is claimed:

1. A method implemented by a distributed gateway (D-GW), the method comprising:
    the D-GW detecting, via layer 2 (L2) attachment signaling or triggers, that a wireless transmit/receive unit (WTRU) has attached to the D-GW;
    the D-GW selecting an Internet protocol (IP) prefix from a pool of locally anchored prefixes to be delegated to the WTRU;
    the D-GW contacting a home subscriber server (HSS), perform a location update procedure, and retrieve information associated with active IP prefixes available to the WTRU
    the D-GW setting up a logical interface associated with establishing communication with the WTRU; and
    the D-GW using the logical interface to advertise the selected IP prefix.

2. The method of claim 1 wherein the D-GW is configured with a plurality of logical interfaces associated with respective ones of a plurality of WTRUs.

3. The method of claim 2 wherein the D-GW includes a physical interface.

4. The method of claim 2 wherein each of the logical interfaces has a logical medium access control (LMAC) address.

5. The method of claim 3 wherein the wireless physical interface has a hardware medium access control (HMAC) address.

6. A distributed gateway (D-GW) comprising:
    a processor configured to:
    detect, via layer 2 (L2) attachment signaling or triggers, that a wireless transmit/receive unit (WTRU) has attached to the D-GW;
    select an Internet protocol (IP) prefix from a pool of locally anchored prefixes to be delegated to the WTRU;
    contact a home subscriber server (HSS), perform a location update procedure, and retrieve information associated with active IP prefixes available to the WTRU;

set up a logical interface associated with establishing communication with the WTRU; and use the logical interface to advertise the selected IP prefix.

7. The D-GW of claim 6 wherein the D-GW is configured with a plurality of logical interfaces associated with respective ones of a plurality of WTRUs.

8. The D-GW of claim 7 wherein the D-GW includes a physical interface.

9. The D-GW of claim 7 wherein each of the logical interfaces has a logical medium access control (LMAC) address.

10. The D-GW of claim 8 wherein the physical interface has a hardware medium access control (HMAC) address.

11. A first distributed gateway (D-GW) comprising:
a processor configured to:
detect a handover of a wireless transmit/receive unit (WTRU) from a second distributed gateway (D-GW) to the first D-GW;
establish a first logical interface and a second logical interface with the WTRU, wherein the first logical interface is associated with the second D-GW and the second logical interface is associated with the first D-GW;
use the first logical interface to advertise a prefix associated with the second D-GW to the WTRU; and
use the second logical interface to advertise a prefix associated with the first D-GW to the WTRU.

12. The first D-GW of claim 11, wherein the processor is further configured to:
contact a home subscriber server (HSS) and perform a location update procedure; and
retrieve subscriber data from the HSS.

13. The first D-GW of claim 11, wherein the processor is further configured to signal to the first D-GW that the WTRU has moved to the second D-GW.

14. The first D-GW of claim 11, wherein the prefix associated with the first D-GW is advertised with a zero lifetime.

15. The first D-GW of claim 11, wherein the prefix associated with the second D-GW is selected by the second D-GW from a pool of locally anchored prefixes.

16. A method implemented in a first distributed gateway (D-GW), the method comprising:
detecting a handover of a wireless transmit/receive unit (WTRU) from a second distributed gateway (D-GW) to the first D-GW;
establishing a first logical interface and a second logical interface with the WTRU, wherein the first logical interface is associated with the second D-GW and the second logical interface is associated with the first D-GW;
using the first logical interface to advertise a prefix associated with the second D-GW to the WTRU; and
using the second logical interface to advertise a prefix associated with the first D-GW to the WTRU.

17. The method of claim 16, further comprising:
contacting a home subscriber server (HSS) and perform a location update procedure; and
retrieving subscriber data from the HSS.

18. The method of claim 16, further comprising signaling to the first D-GW that the WTRU has moved to the second D-GW.

19. The method of claim 16, wherein the prefix associated with the first D-GW is advertised with a zero lifetime.

20. The method of claim 16, wherein the prefix associated with the second D-GW is selected by the second D-GW from a pool of locally anchored prefixes.

* * * * *